US006672618B2

(12) United States Patent
Keshavaraj

(10) Patent No.: US 6,672,618 B2
(45) Date of Patent: Jan. 6, 2004

(54) MULTIPLE PANEL AIRBAG AND METHOD

(75) Inventor: Ramesh Keshavaraj, Pechtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/891,956

(22) Filed: Jun. 26, 2001

(65) Prior Publication Data

US 2002/0043792 A1 Apr. 18, 2002

Related U.S. Application Data

(60) Provisional application No. 60/241,171, filed on Oct. 17, 2000.

(51) Int. Cl.[7] .............................................. B60R 21/16
(52) U.S. Cl. .................................................... 280/743.1
(58) Field of Search ........................... 280/743.1, 728.1, 280/729, 743.2

(56) References Cited

U.S. PATENT DOCUMENTS

| | | | |
|---|---|---|---|
| 3,792,873 A | 2/1974 | Buchner et al. ............. 280/150 |
| 4,921,735 A | 5/1990 | Bloch ......................... 428/34.9 |
| 4,944,529 A | 7/1990 | Backhaus .................... 280/743 |
| 5,087,071 A | 2/1992 | Wallner et al. .............. 280/743 |
| 5,090,729 A | 2/1992 | Watanabe .................... 280/743 |
| 5,093,163 A | 3/1992 | Krummheuer et al. ..... 428/35.1 |
| 5,110,666 A | 5/1992 | Menzel et al. ............... 428/196 |
| 5,236,775 A | 8/1993 | Swoboda et al. ............ 428/225 |
| 5,277,230 A | 1/1994 | Sollars, Jr. .................. 139/389 |
| 5,310,216 A | 5/1994 | Wehner et al. ............... 280/743 |
| 5,316,337 A | 5/1994 | Yamaji et al. ............... 280/743 |
| 5,356,680 A | 10/1994 | Krummheuer et al. ..... 428/36.1 |
| 5,423,273 A | 6/1995 | Hawthorn et al. ........... 112/441 |
| 5,454,594 A | 10/1995 | Krickl ........................ 280/743.1 |
| 5,477,890 A | 12/1995 | Krummheuer et al. ...... 139/291 |
| 5,482,318 A * | 1/1996 | Sollars, Jr. ................. 280/743.1 |
| 5,503,197 A | 4/1996 | Bower et al. .............. 139/435.1 |
| 5,508,073 A | 4/1996 | Krummheuer et al. ..... 428/35.1 |
| 5,520,414 A | 5/1996 | Bishop ...................... 280/743.1 |
| 5,586,782 A | 12/1996 | Zimmerman, II et al. ........................ 280/730.2 |
| 5,704,402 A | 1/1998 | Bowen et al. ............... 139/389 |
| 5,855,393 A | 1/1999 | Keshavaraj .............. 280/743.1 |
| 5,975,571 A * | 11/1999 | Ford et al. ................ 280/743.1 |
| 6,019,390 A | 2/2000 | Keshavaraj .............. 280/743.1 |
| 2001/0040368 A1 * | 11/2001 | Okada et al. ............. 280/743.2 |

FOREIGN PATENT DOCUMENTS

| | | | |
|---|---|---|---|
| DE | 24 39 222 | * | 2/1976 |
| JP | 408020305 A | | 1/1996 |
| JP | 408230592 A | | 9/1996 |
| JP | 409175300 A | | 7/1997 |
| JP | 11-48889 | * | 2/1999 |

* cited by examiner

Primary Examiner—Peter C. English
(74) Attorney, Agent, or Firm—Terry T. Moyer; Daniel R. Alexander

(57) ABSTRACT

An airbag cushion for use in a vehicle restraint system is provided. The airbag cushion is formed from a notched body panel and a rectilinear center panel by a series of substantially straight seams which reduces substantially the elongation of the air bag cushion upon impact on collision of the vehicle in which it is installed. A method of forming the cushion according to the present invention is also provided.

32 Claims, 20 Drawing Sheets

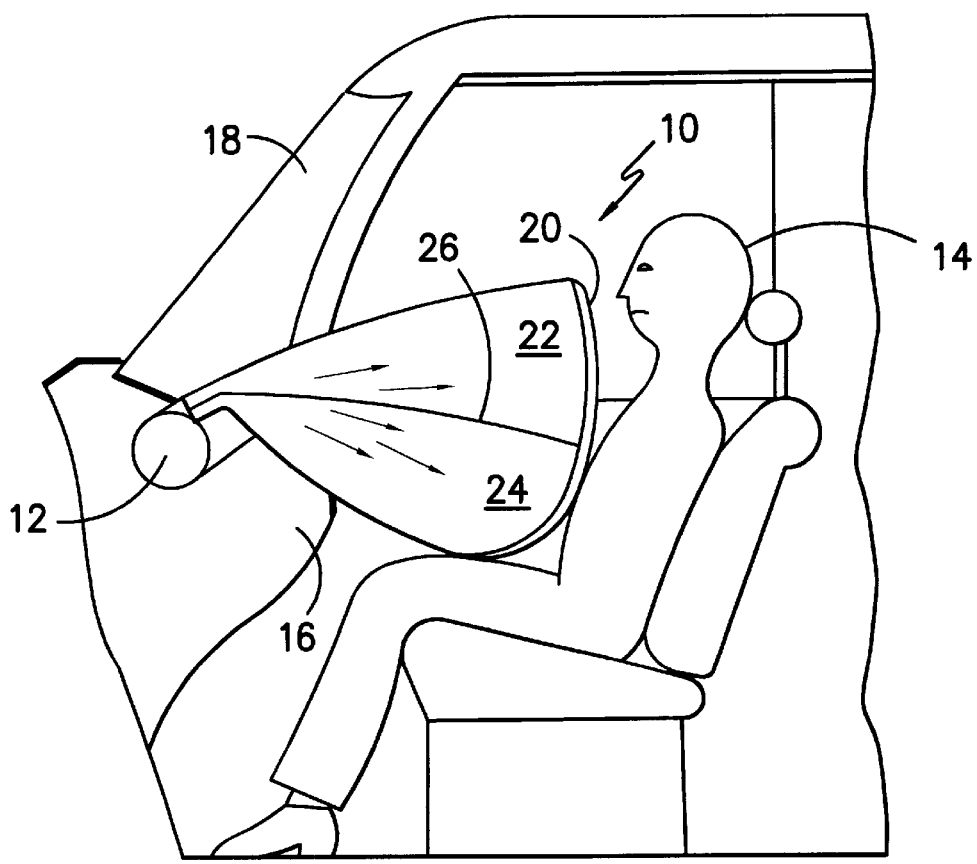
FIG. -1-
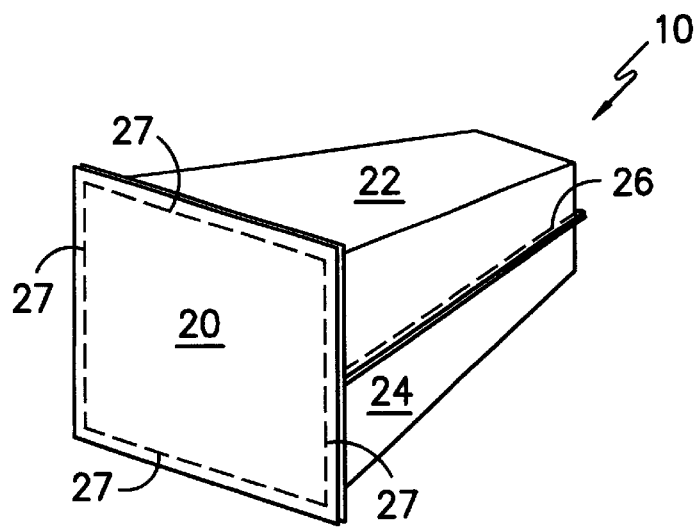
FIG. -2-

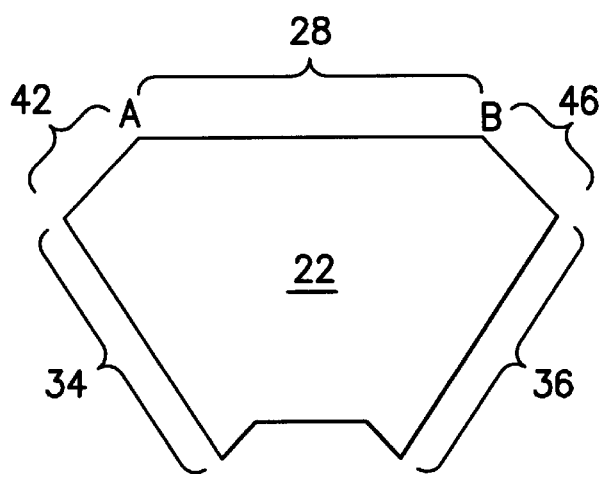
FIG. -3A-
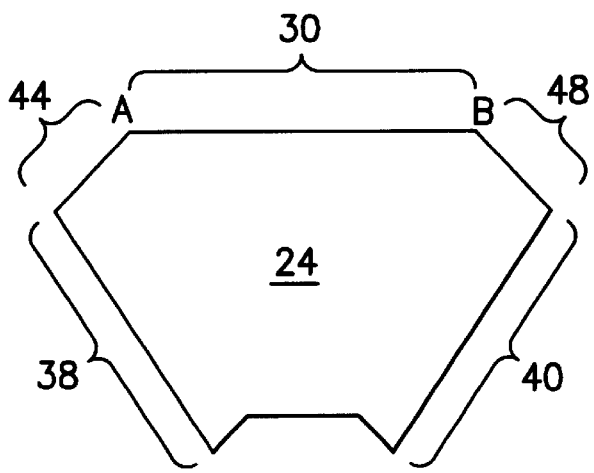
FIG. -3B-
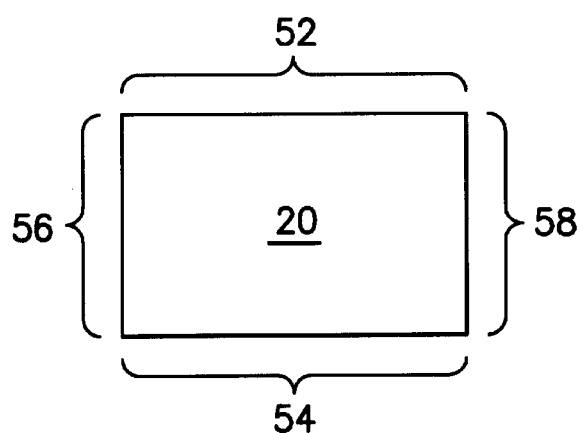
FIG. -3C-

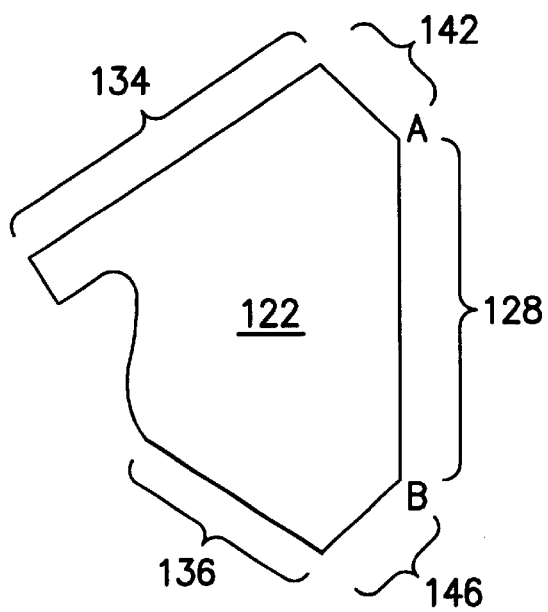
FIG. -4A-
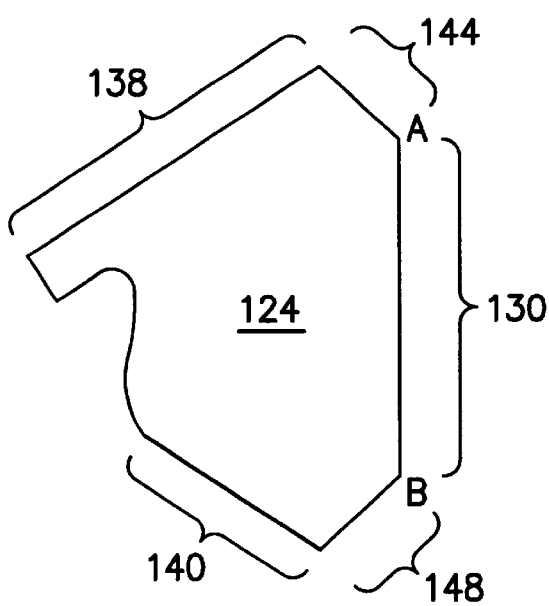
FIG. -4B-
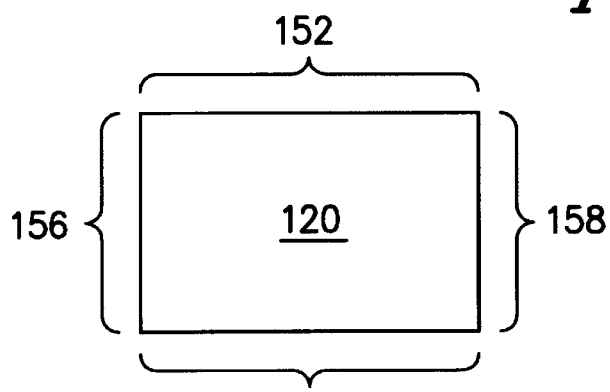
FIG. -4C-

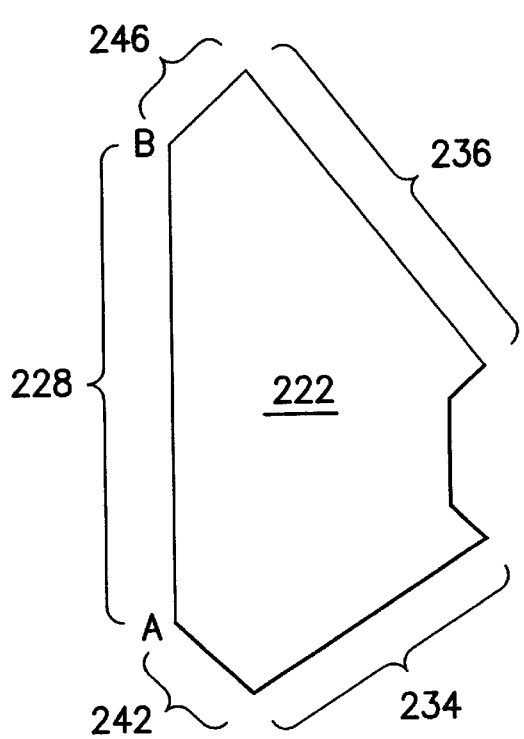
FIG. -5A-
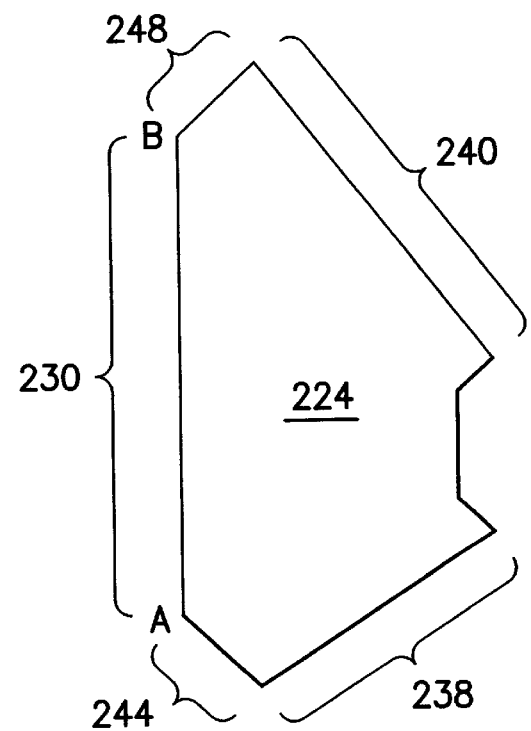
FIG. -5B-
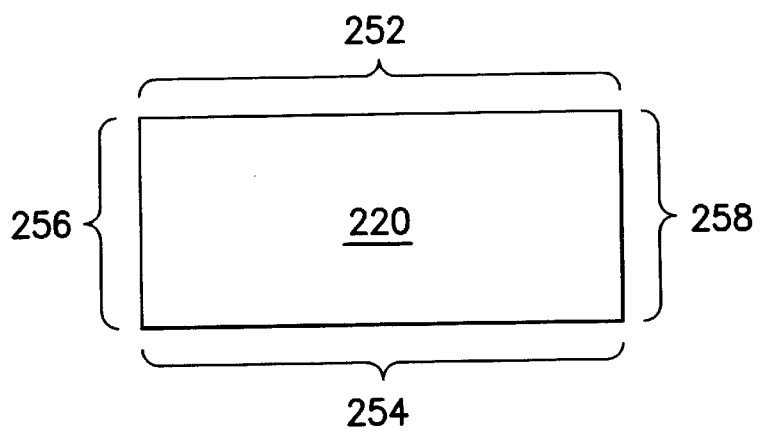
FIG. -5C-

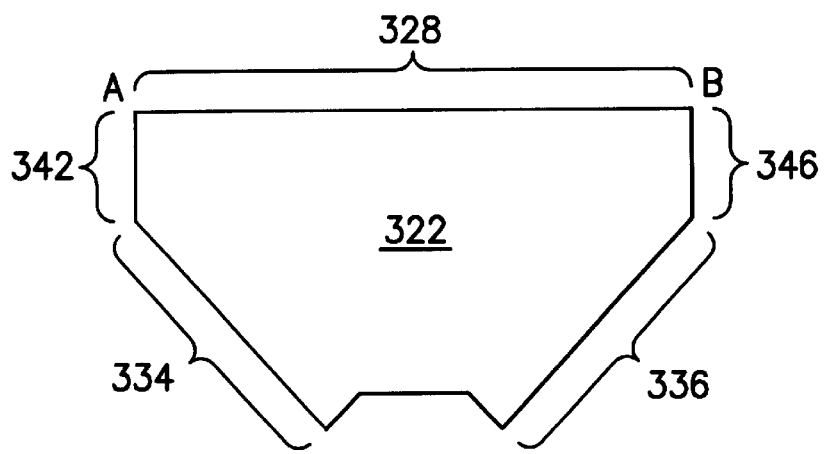
FIG. -6A-
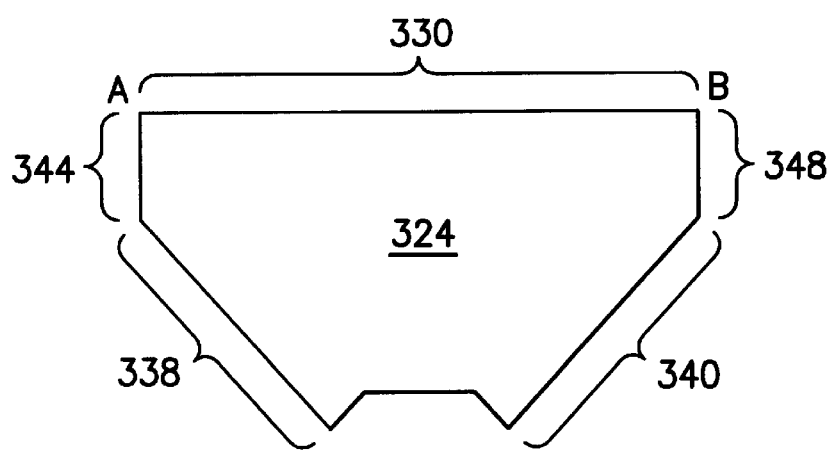
FIG. -6B-
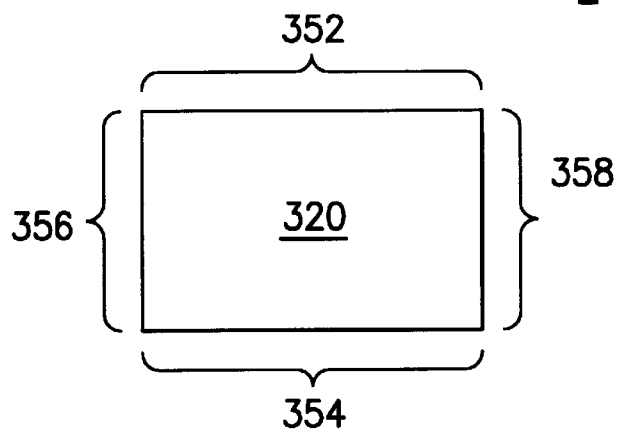
FIG. -6C-

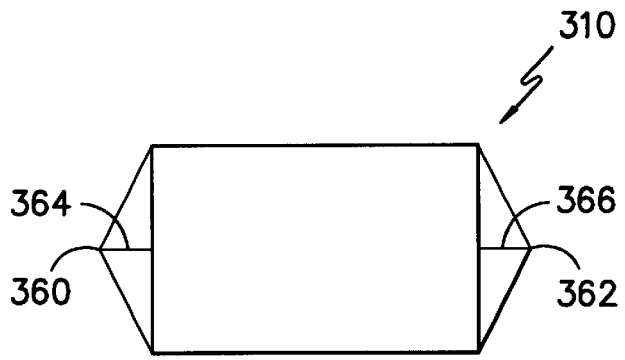
FIG. -6D-
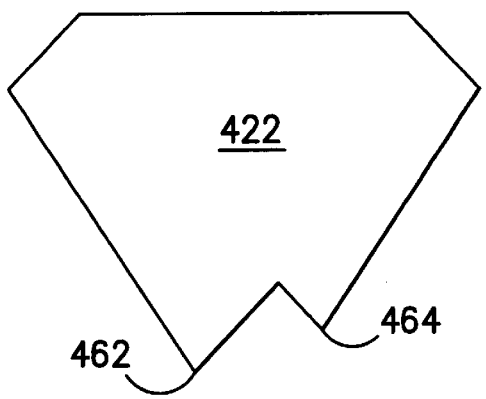
FIG. -7A-
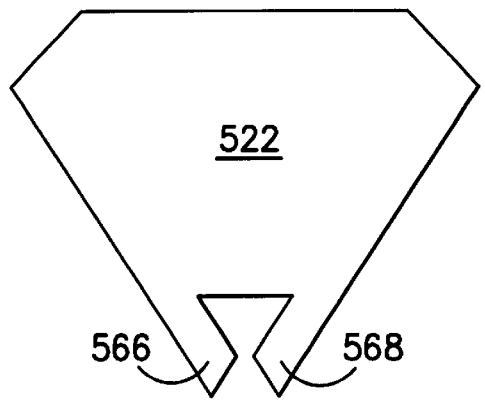
FIG. -7B-
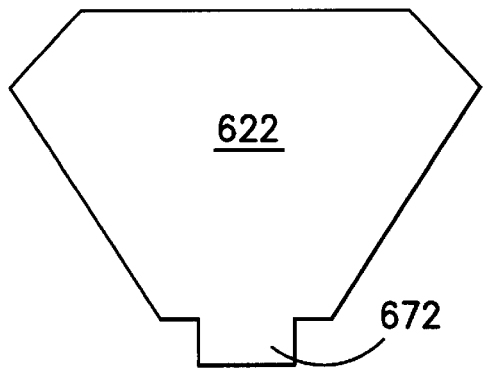
FIG. -7C-

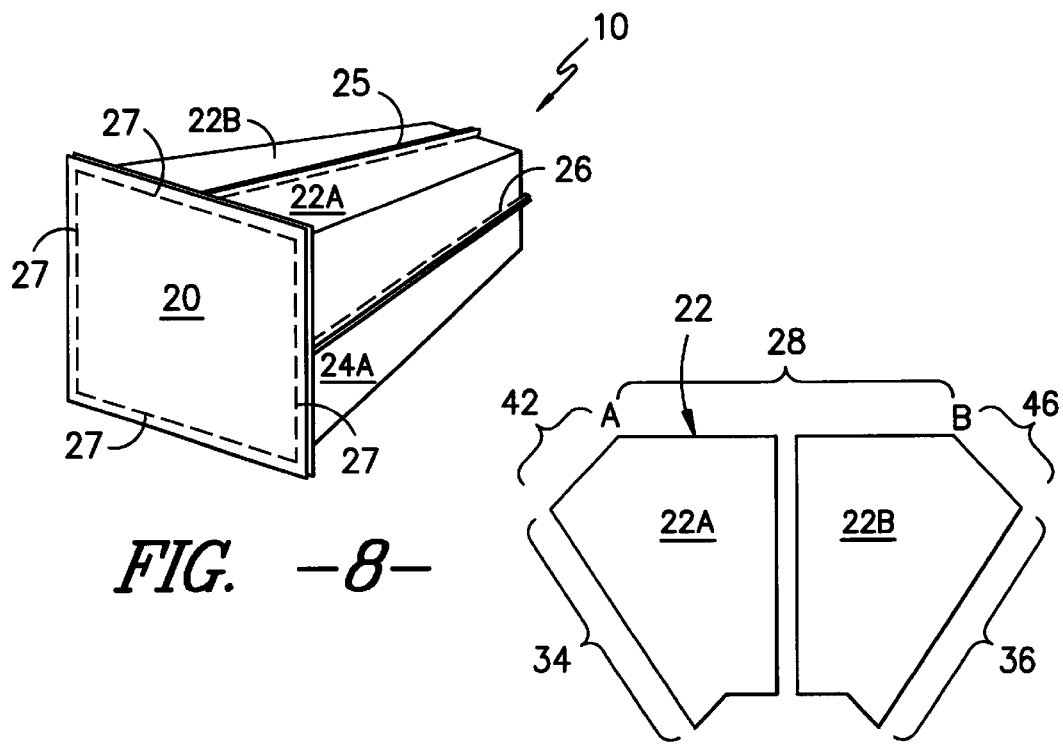
FIG. -8-
FIG. -9A-
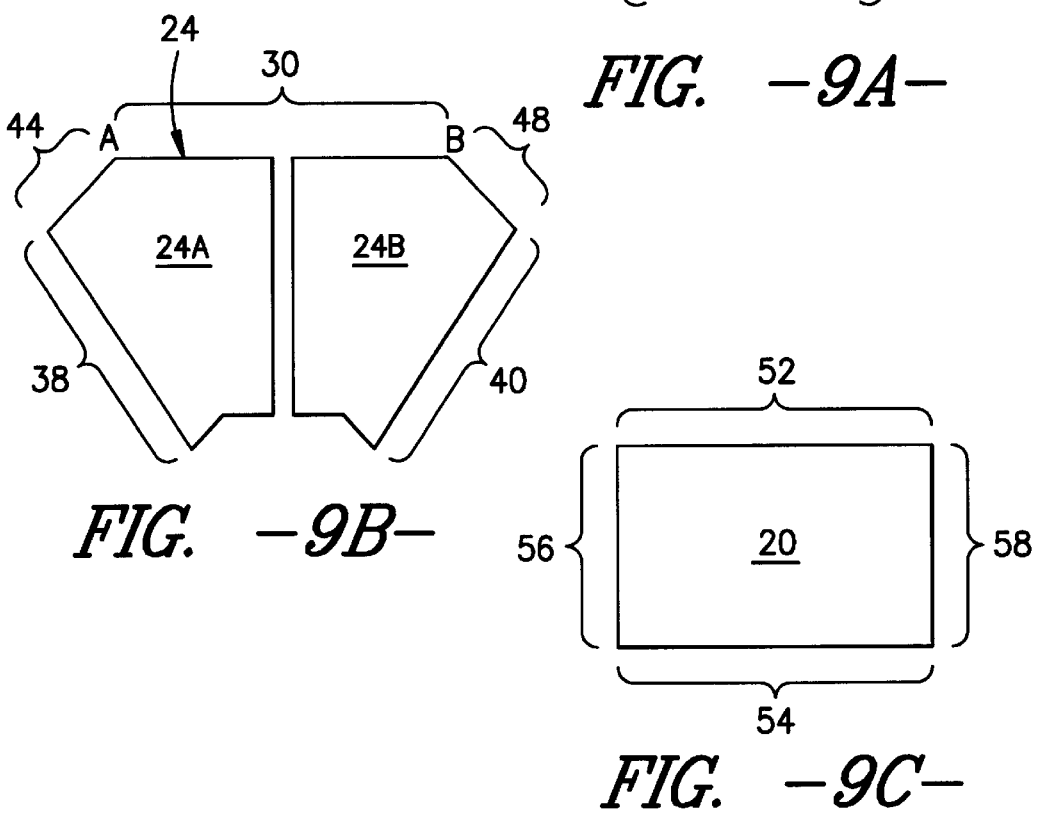
FIG. -9B-
FIG. -9C-

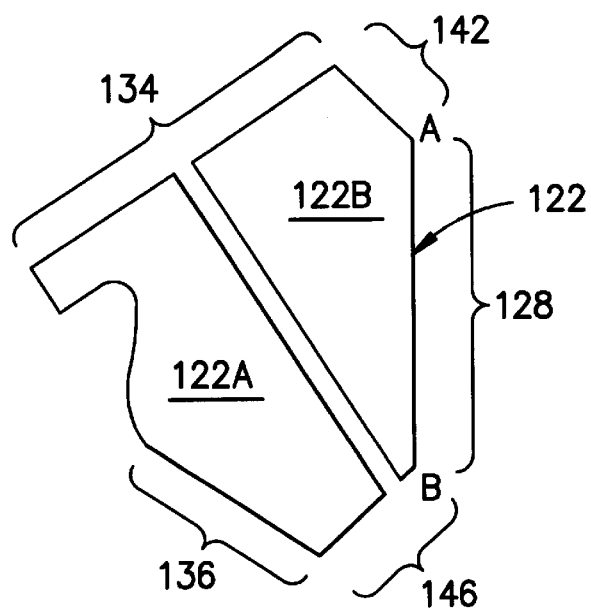
FIG. -10A-
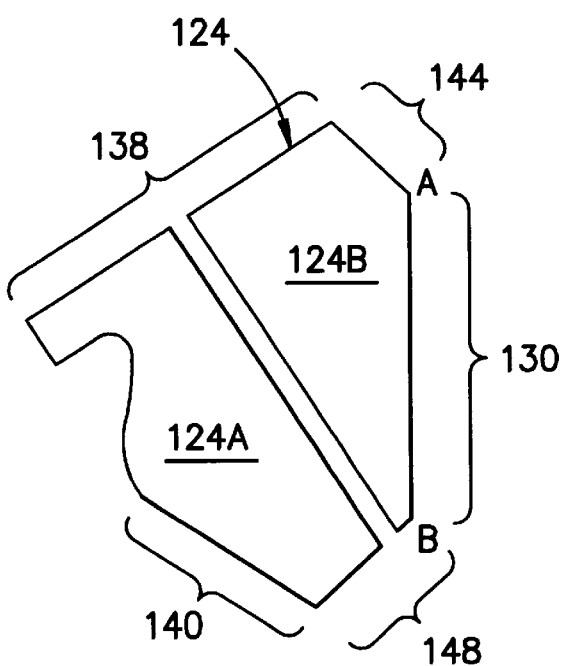
FIG. -10B-
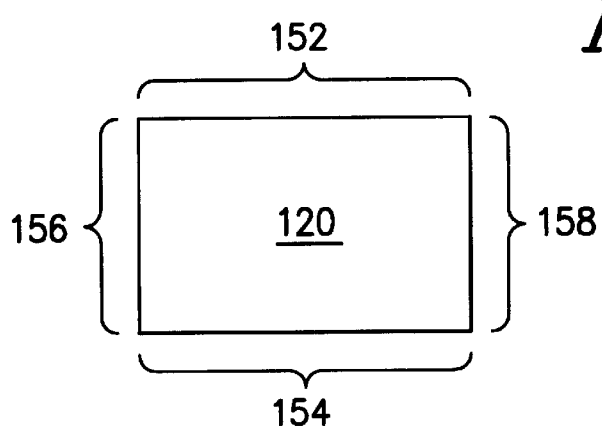
FIG. -10C-

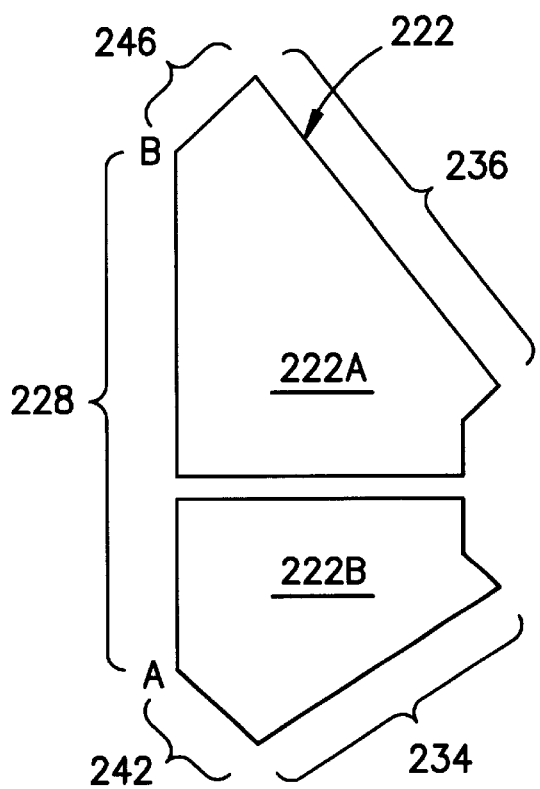
FIG. −11A−
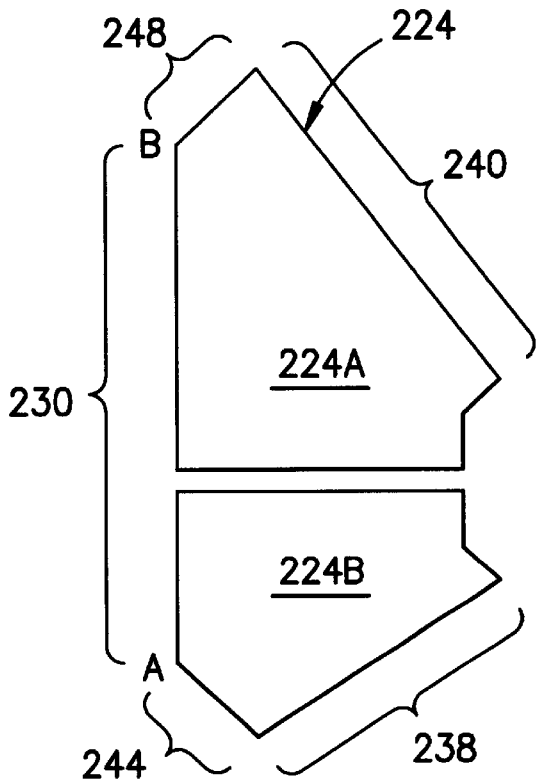
FIG. −11B−
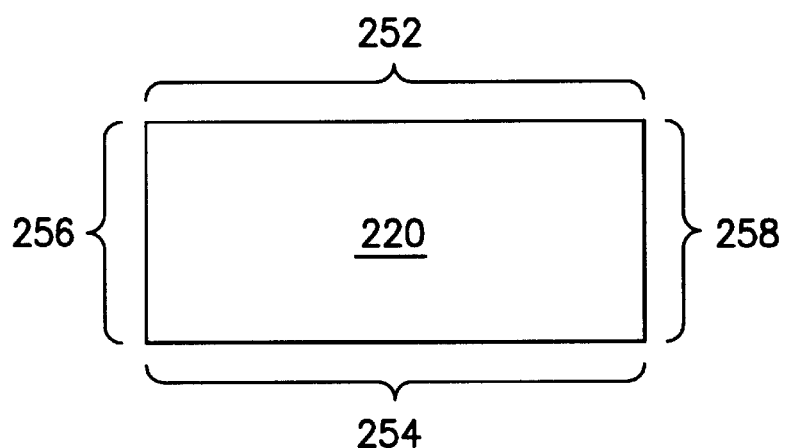
FIG. −11C−

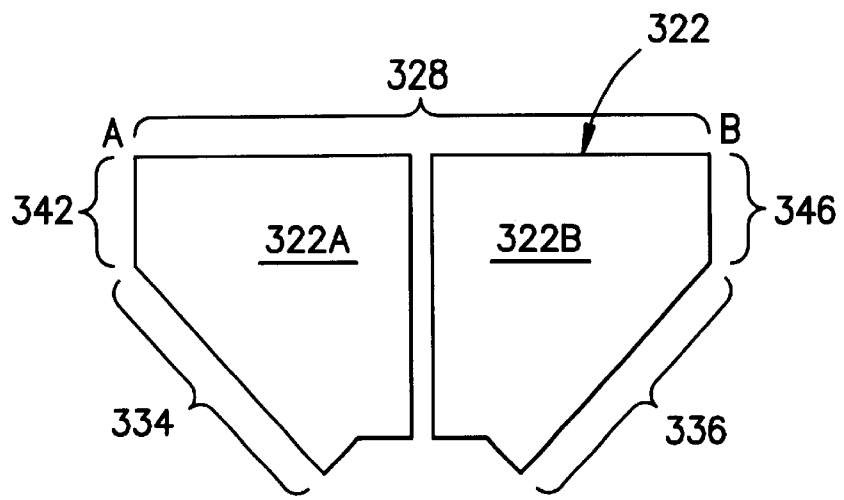
FIG. -12A-
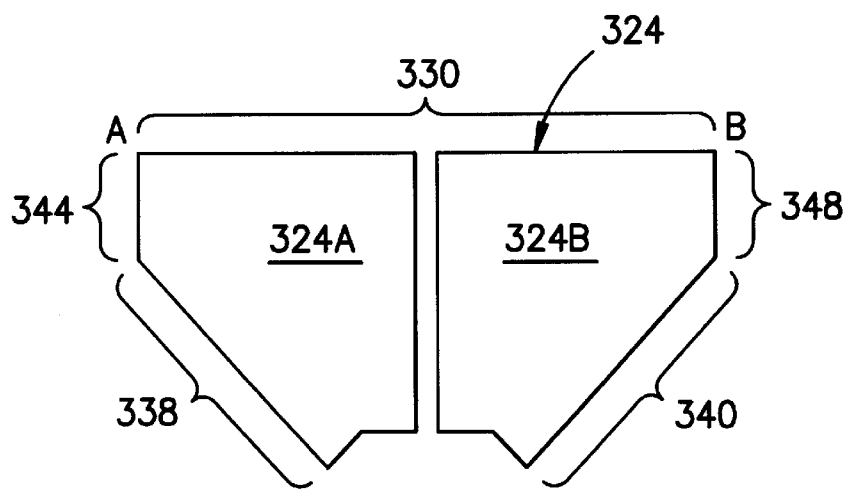
FIG. -12B-
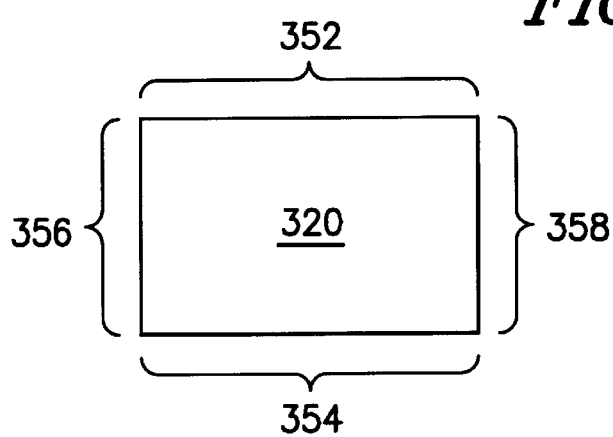
FIG. -12C-

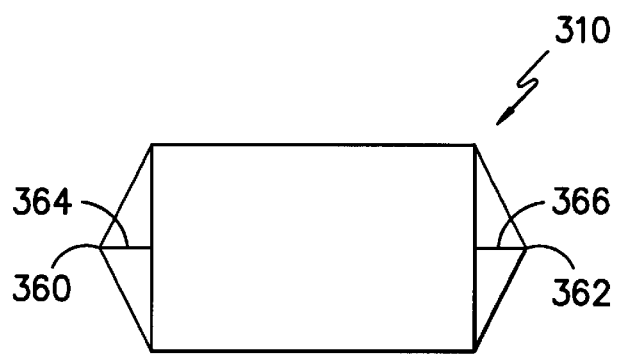
FIG. -12D-
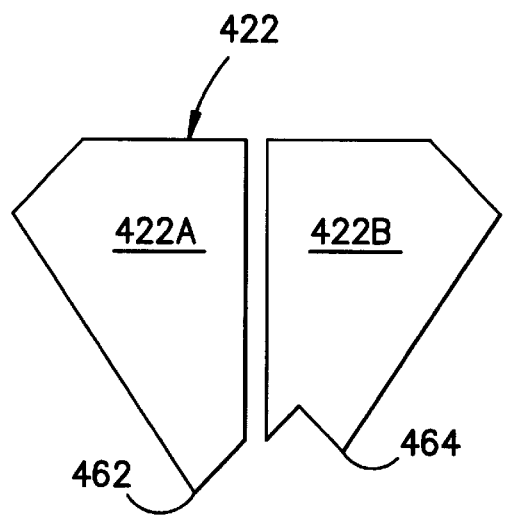
FIG. -13A-
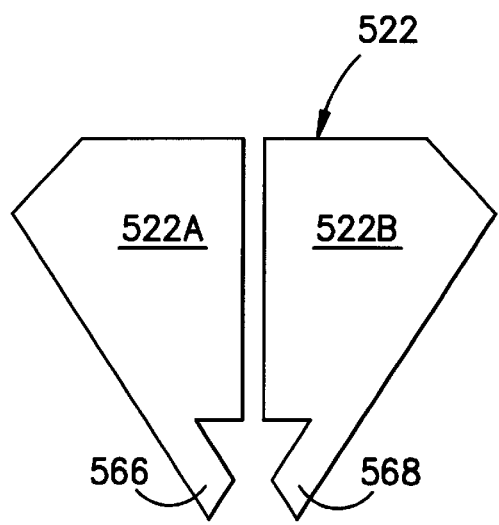
FIG. -13B-
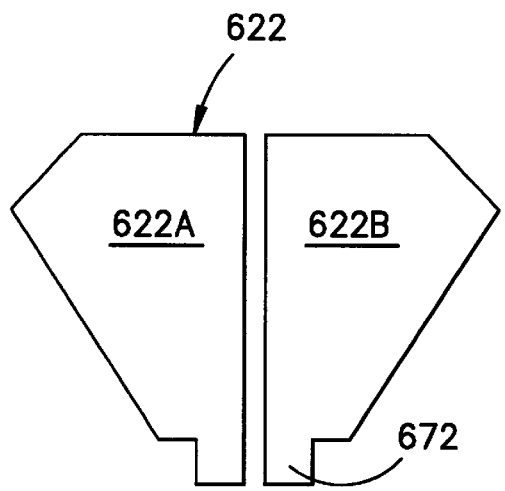
FIG. -13C-

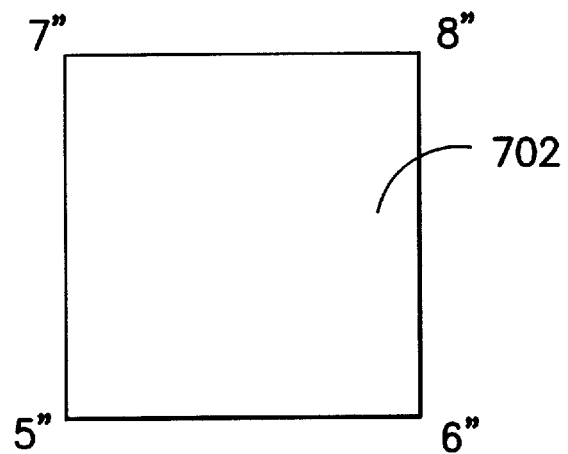
FIG. —14A—
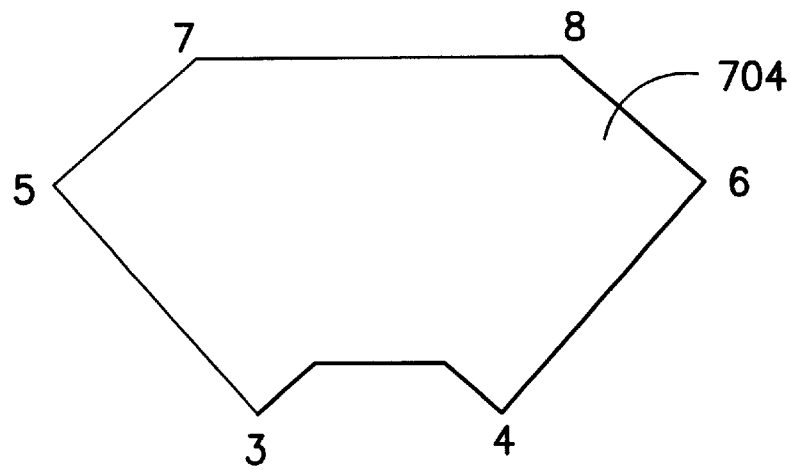
FIG. —14B—
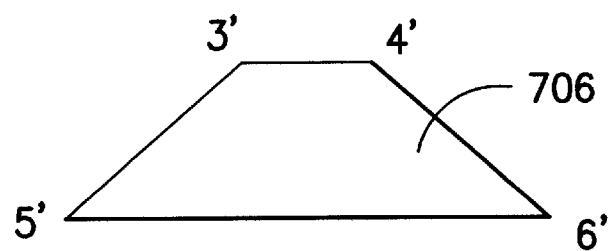
FIG. —14C—

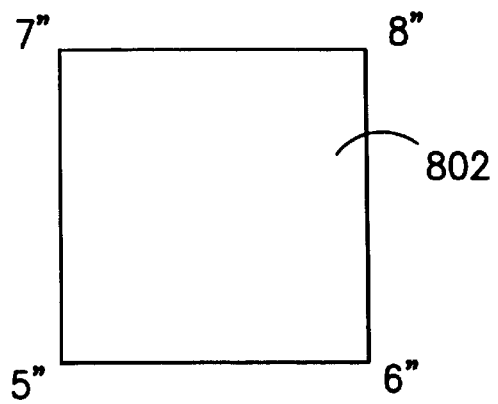
FIG. —15A—
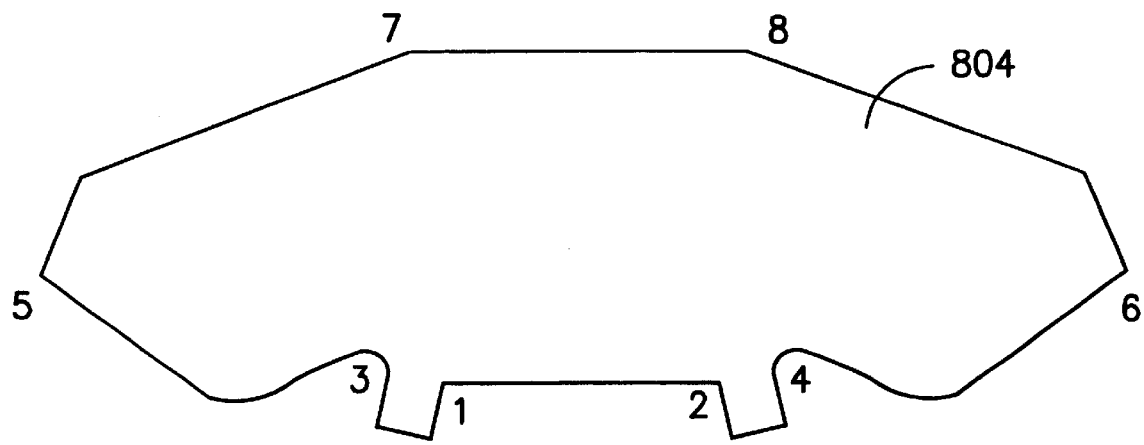
FIG. —15B—
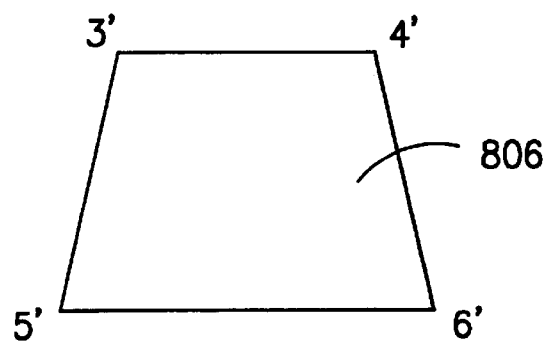
FIG. —15C—

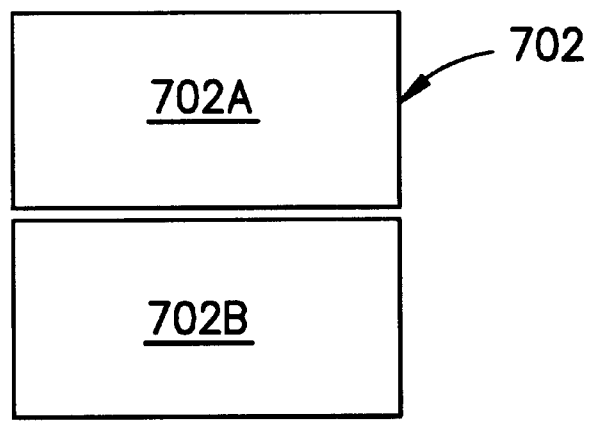
FIG. -16A-
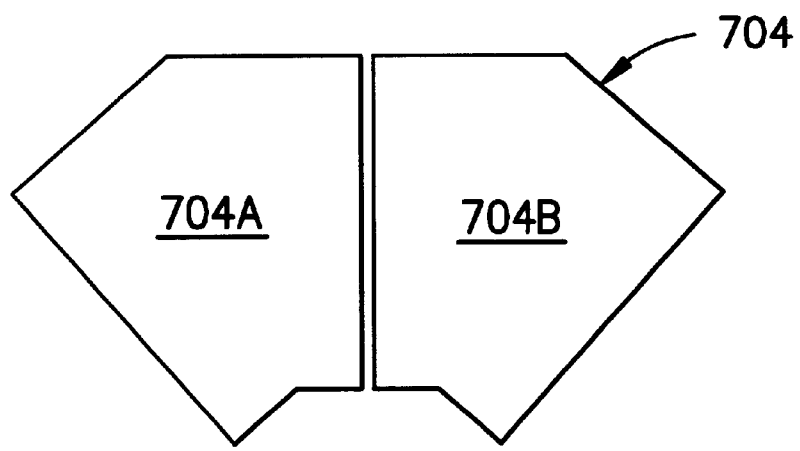
FIG. -16B-
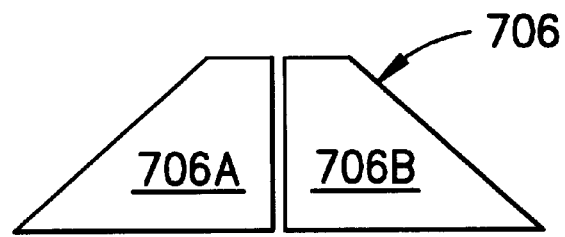
FIG. -16C-

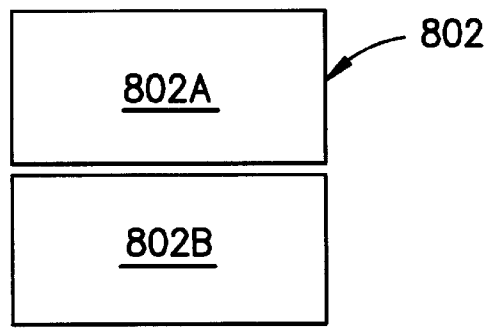
FIG. -17A-
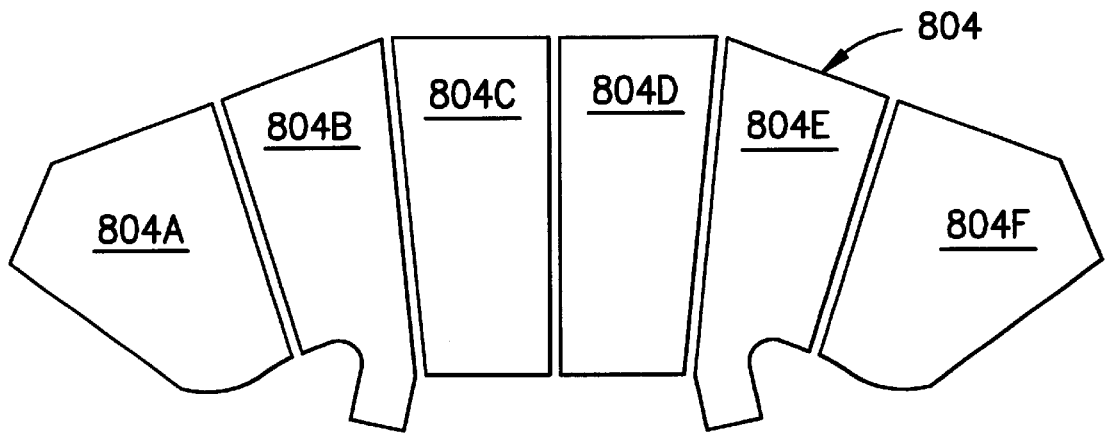
FIG. -17B-
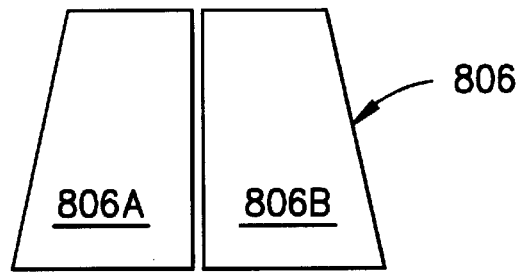
FIG. -17C-

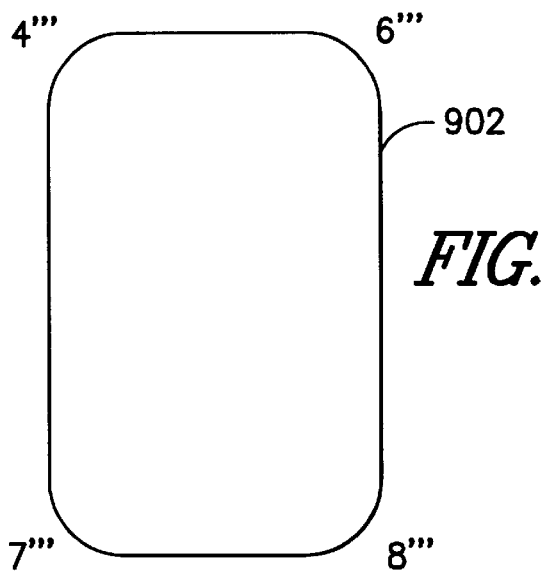
FIG. -18A-
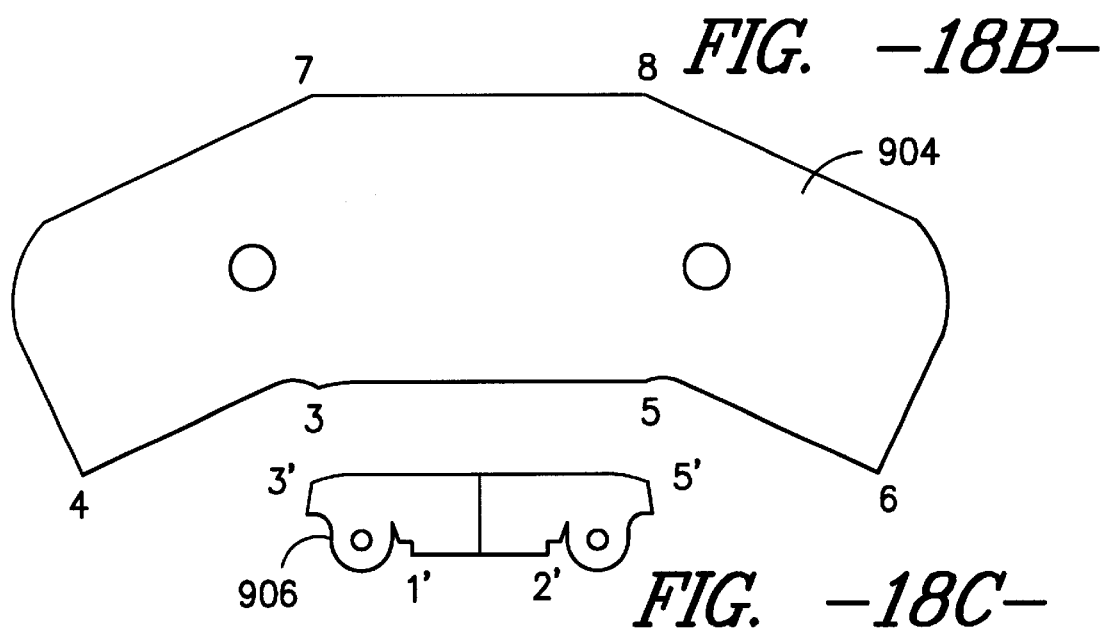
FIG. -18B-
FIG. -18C-
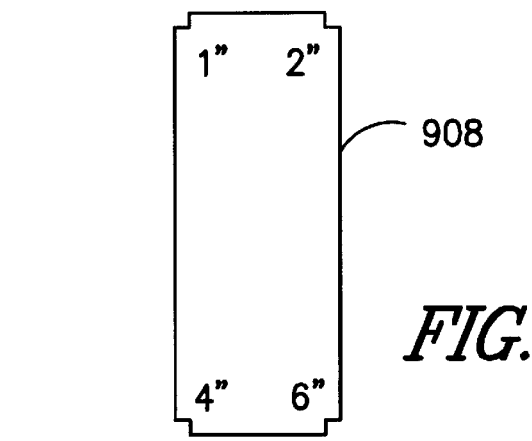
FIG. -18D-

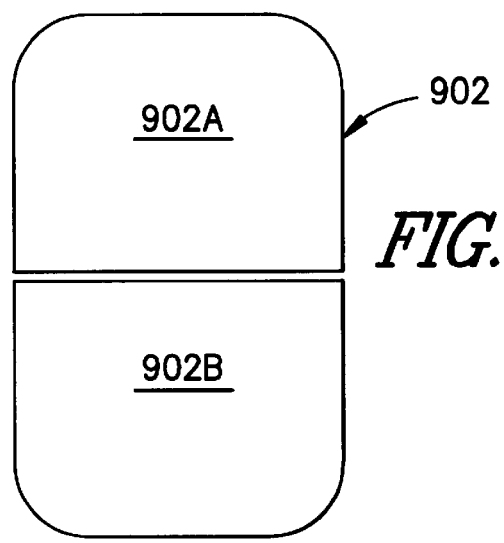
FIG. -19A-
FIG. -19B-
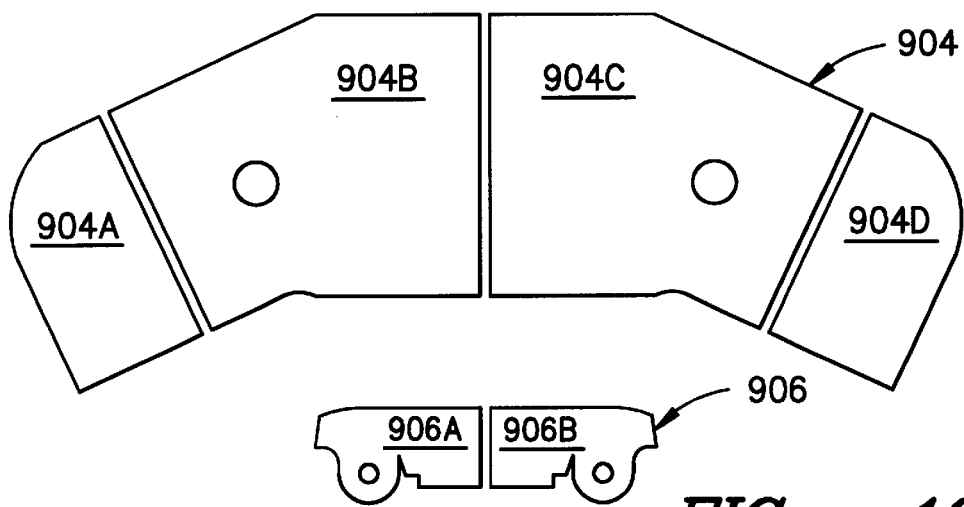
FIG. -19C-
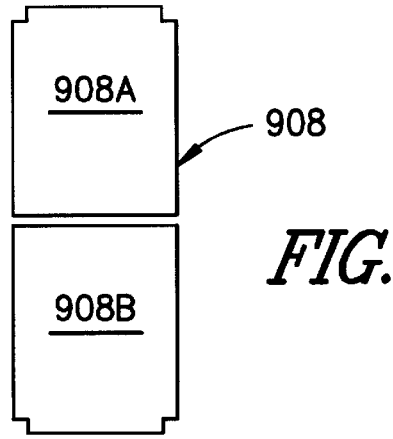
FIG. -19D-

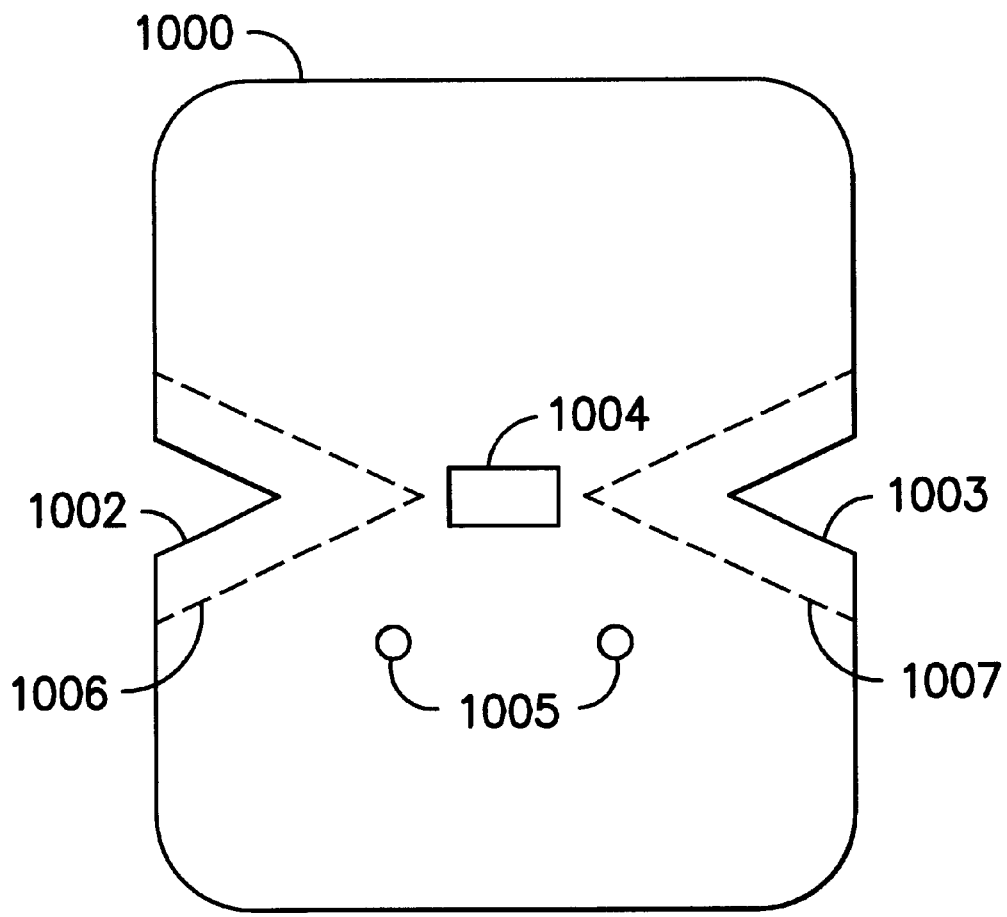
FIG. -20-

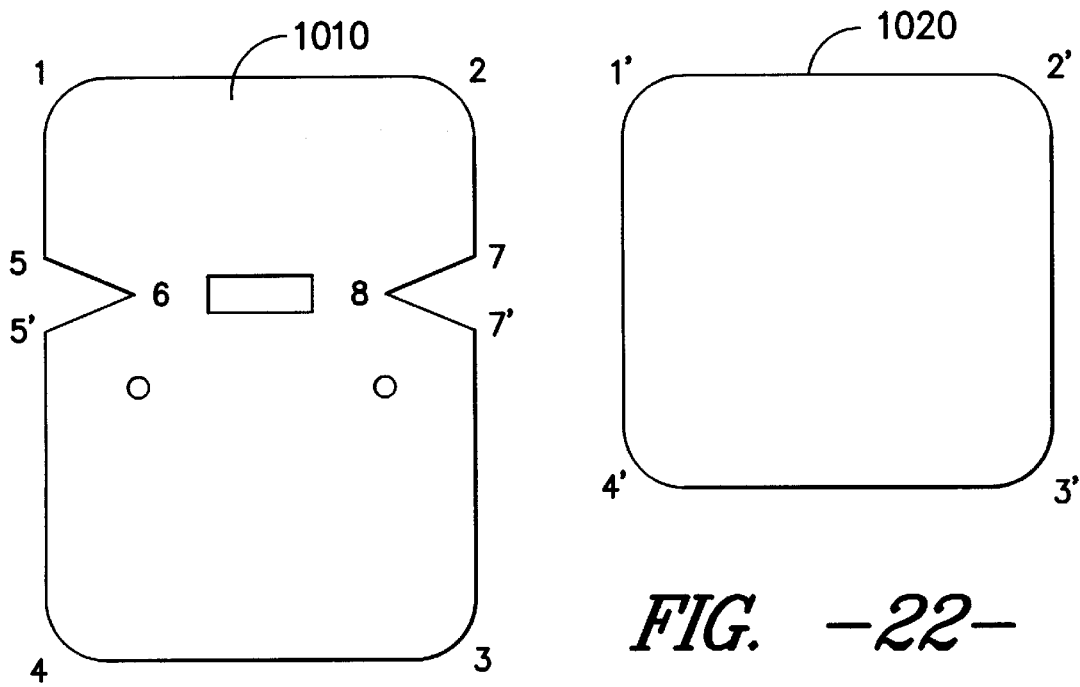
FIG. -21-
FIG. -22-
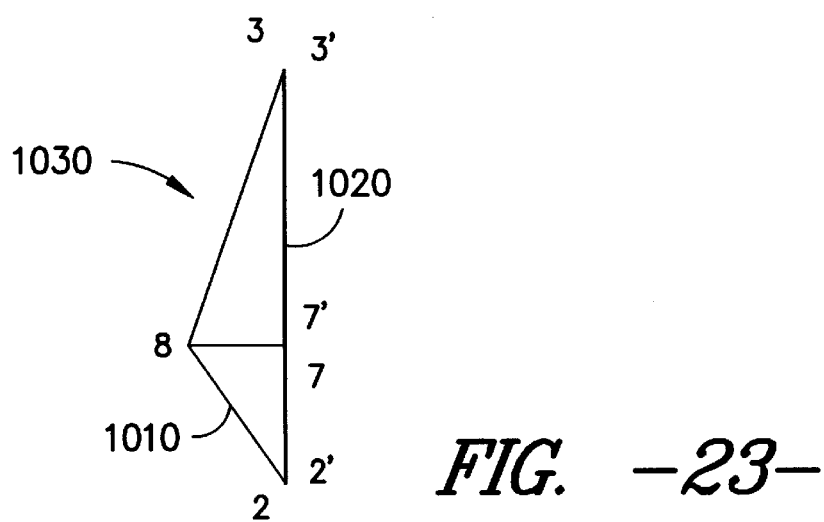
FIG. -23-

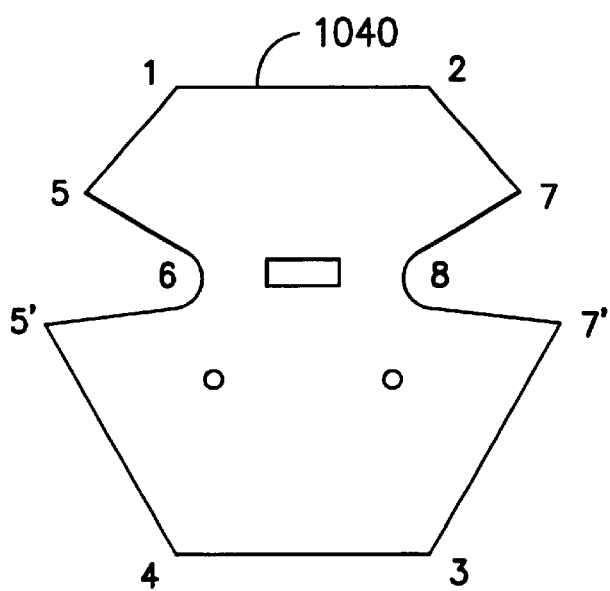
FIG. -24-
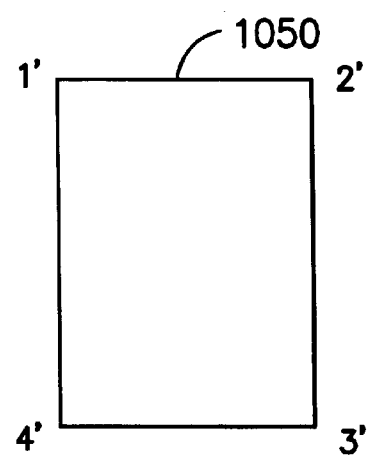
FIG. -25-

MULTIPLE PANEL AIRBAG AND METHOD

REFERENCE TO RELATED APPLICATION

This application claims priority to and benefit of U.S. Provisional Patent Application Serial No. 60/241,171, filed Oct. 17, 2000, hereby incorporated by reference herein.

This application is related to U.S. patent application Ser. No. 09/640,682, filed Aug. 18, 2000, entitled "Multiple Panel Airbag and Method", and is hereby incorporated by reference.

This application is related to commonly owned, U.S. Pat. No. 6,019,390, issued Feb. 1, 2000, hereby incorporated by reference.

FIELD OF THE INVENTION

The present invention relates to inflatable protective cushions, and provides a cushion construction particularly useful in the frontal or side protection of occupants in a transportation vehicle, such as an automotive vehicle, railroad, car, airplane or the like. The invention is also directed to a module and/or overall vehicle restraint system including the inventive airbag cushion. A process or method for forming the cushion according to the present invention is also provided.

BACKGROUND

As described in U.S. Pat. No. 6,019,390, inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filling the cushion to a deployed state which can absorb the impact of the forward movement of a body and dissipate its energy by means of rapid venting of the gas. The entire sequence of events occurs within about 30 milliseconds. In the un-deployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,414 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch issued May 1, 1990; U.S. Pat. No. 5,093,163 to Krummheuer et al. issued Mar. 3, 1992; U.S. Pat. No. 5,110,666 to Menzel et al. issued May 5, 1992; U.S. Pat. No. 5,236,775 to Swoboda et al. issued Aug. 17, 1993; U.S. Pat. No. 5,277,230 to Sollars, Jr. issued Jan. 11, 1994; U.S. Pat. No. 5,356,680 to Krummheuer et al. issued Oct. 18, 1994; U.S. Pat. No. 5,477,890 to Krummheuer et al. issued Dec. 26, 1995; U.S. Pat. No. 5,508,073 to Krummheuer et al. issued Apr. 16, 1996; U.S. Pat. No. 5,503,197 to Bower et al. issued Apr. 2, 1996, and U.S. Pat. No. 5,704,402 to Bowen et al. issued Jan. 6, 1998, all of which are incorporated herein by reference.

As will be appreciated, the permeability of the cushion structure is an important factor in determining the rate of inflation and subsequent rapid deflation following the impact event. In order to control the overall permeability of the cushion, it may be desirable to use differing materials in different regions of the cushion. Thus, the use of several fabric panels in construction of the cushion may prove to be a useful design feature. The use of multiple fabric panels in the cushion structure also permits the development of relatively complex three dimensional geometries which may be of benefit in the formation of cushions for passenger side applications wherein a full bodied cushion is desired. While the use of multiple fabric panels provides several advantages in terms of permeability manipulation and geometric design, the use of multiple fabric panels for use in passenger side restraint cushions has historically required the assembly of panels having multiple different geometries involving multiple curved seams.

As will be appreciated, an important consideration in cutting panel structures from a base material is the ability to maximize the number of panels which can be cut from a fixed area through close-packed nesting of the panels. It has been found that minimizing the number of different geometries making up panels in the cushion and using geometries with substantially straight line perimeter configurations generally permits an enhanced number of panels to be cut from the base material. The use of panels having generally straight line profiles has the added benefit of permitting the panels to be attached to one another using substantially straight seams or be substantially formed during the weaving process using a jacquard or dobby loom.

SUMMARY OF THE INVENTION

The present invention provides a passenger side airbag configuration which may be constructed from two body panel sections and one center panel section. Each section may be made up of more than one panel or piece. The body panel sections are connected to one another and to the center panel by a series of substantially flat, straight seams. Thus, the airbag configuration formed according to the present invention results in highly efficient utilization of materials and may be constructed substantially without the need for complex curved seaming operations. As such, the present invention constitutes a useful advancement over the present art.

In view of the foregoing, it is a general object of the present invention to provide a highly effective easily manufactured inflatable occupant restraining cushion.

It is a more particular object of the present invention to provide an inflatable occupant restraining cushion manufactured from two body panel sections and a center panel or section. Each panel section may be made up of more than one panel or piece.

It is a further object of the present invention to provide an inflatable occupant restraining cushion manufactured from panel sections and/or panels connected to one another by a series of substantially straight, flat seams.

It is another object of the present invention to provide an inflatable occupant restraining cushion manufactured from the fabric panel sections woven and connected together on a jacquard or dobby weaving machine such that a substantially complete cushion is formed on the weaving machine.

It is yet an additional object of the present invention to provide an inflatable occupant restraining cushion formed from panel sections having two basic geometries which can be nested in close spaced relation across a sheet of material thereby promoting good material utilization in a cut and sew operation.

A further object of the invention is to provide an inflatable occupant restraining cushion which employees a body panel section so designed to provide an air bag portion formed with straight seams which inhibits extreme expansion of the restraining cushion upon release of gas therein due to detonation of the inflator upon impact caused by a collision of the automobile or truck in which it is mounted.

It is still a further object of the present invention to provide an easily manufactured inflatable occupant restraining cushion formed from material panels which exhibit differing air permeability characteristics so as to optimize the overall air permeability characteristics of the cushion.

It is yet an additional object of the present invention to provide an easily manufactured inflatable occupant restraining cushion formed from a combination of coated and uncoated material panels.

Another object of the invention is to provide a method of making a low cost inflatable protective cushion of simple and structurally efficient design.

To achieve these and other objects and in accordance with the purpose of the invention, as embodied and broadly described herein, the present invention provides an airbag cushion for use in a vehicle restraint system, which in the most preferred embodiment includes two body panel sections of substantially similar geometry joined to one another by two substantially straight seams along corresponding lateral boundary edges. The boundary segments of the body panels which are not joined to one another are joined around the perimeter of a quadrilateral center panel by a series of substantially straight seams thereby forming an inflatable cushion structure.

Additional objects and advantages of the invention will be set forth in part in the description which follows, and in part will be obvious from the description, or may be learned by practice of the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 illustrates a cutaway view of the inflatable cushion of the present invention in deployment between a passenger and a dash panel;

FIG. 2 is a front perspective view of the cushion according to the present invention with its seams on the exterior wherein the term "front" is meant to designate that portion of the cushion which is intended to be impacted by a person or object to be protected;

FIGS. 3A–3C illustrate the body panel sections and center panel of a first potentially preferred embodiment of the cushion according to the present invention;

FIGS. 4A–4C illustrate the body panel sections and center panel of a second potentially preferred embodiment of the cushion according to the present invention for use in an environment where an expended curved profile is desirable to meet depth requirements;

FIGS. 5A–5C illustrate the body panel sections and center panel of a third potentially preferred embodiment of the cushion according to the present invention for use in covering substantial elongated areas as may be desired in full body or side impact applications;

FIGS. 6A–6C illustrate the body panel sections and center panel of yet a fourth potentially preferred embodiment of the cushion according to the present invention which provides for an expanded frontal surface for impact by a person or occupant to be protected;

FIG. 6D illustrates the front view of the center panel and body panel sections of FIGS. 6A–6C with the panels joined together;

FIGS. 7A–7C illustrates various potentially preferred mouth configurations for use in the cushion according to the present invention;

FIG. 8 is a front perspective view of the cushion according to another embodiment of the present invention with its seams on the exterior wherein the term "front" is meant to designate that portion of the cushion which is intended to be impacted by a person or object to be protected;

FIGS. 9A–9C illustrate the body panel sections and center panel of another potentially preferred embodiment of the cushion according to the present invention and FIG. 8;

FIGS. 10–10C illustrate the body panel section panels and center panel of yet another potentially preferred embodiment of the cushion according to the present invention for use in an environment where an expanded curved profile is desirable to meet depth requirements;

FIGS. 11A–11C illustrate the body panel section panels and center panel of still another potentially preferred embodiment of the cushion according to the present invention for use in covering substantial elongated areas as may be desired in full body or side impact applications;

FIGS. 12A–12C illustrate the body panel section panels and center panel of another potentially preferred embodiment of the cushion according to the present invention which provides for an expanded frontal surface for impact by a person or occupant to be protected;

FIG. 12D illustrates the front view of the center panel and body panel section panels of FIGS. 12A–12C with the panels joined together;

FIGS. 13A–13C illustrate various potentially preferred mouth configurations for use in the cushion according to the present invention;

FIGS. 14A–14C illustrate the top, center (body), and bottom panel sections of another embodiment according to the present invention;

FIGS. 15A–15C illustrate the top, center (body), and bottom panel sections of yet another embodiment according to the present invention;

FIGS. 16A–16C illustrate the top, center (body), and bottom panel section panels of FIGS. 14A–14C in accordance with another embodiment;

FIGS. 17A–17C illustrate the top, center (body), and bottom panel section panels of FIGS. 15A–15C according to another embodiment of the present invention;

FIGS. 18A–18D represent the respective panel sections of another embodiment of the present invention with a loop pocket to hold an inflator;

FIGS. 19A–19D illustrate the panel section panels of FIGS. 18A–18D according to yet another embodiment of the present invention;

FIG. 20 is a schematic view of a notched body panel in accordance with another embodiment of the present invention;

FIG. 21 is a schematic view of a notched body panel in accordance with another embodiment of the present invention;

FIG. 22 is a schematic view of a center (or front) panel for use with the body panel of FIG. 21;

FIG. 23 is a schematic side view representation of an inflated airbag having the front and rear panels shown in FIGS. 21 and 22 with the notches sewn shut to provide the desired profile or depth;

FIG. 24 is a schematic view of a notched body panel in accordance with still another embodiment of the present invention; and, FIG. 25 is a schematic view of a center (or front) panel adapted to be used with the body panel of FIG. 24.

DESCRIPTION OF PREFERRED EMBODIMENTS

Reference will now be made in detail to potentially preferred embodiments of the invention, examples of which have been illustrated in the accompanying drawings. It is to be understood that it is in no way intended to limit the invention to such illustrated and described embodiments. On the contrary, it is intended to cover all alternatives, modifications and equivalents as may be included within the true spirit and scope of the invention as defined by the appended claims and equivalents thereto.

Turning now to the drawings, wherein like elements are denoted by like reference numerals throughout the various views, in FIG. 1 there is shown an inflatable restraint cushion 10 for use with an inflator 12 to protect a vehicle occupant 14 from impacting against a dash panel 16, windshield 18 or other interior surface in the event of a collision. As will be noted, the inflatable restraint cushion 10 includes a frontal impact center panel or section 20 and two body panel sections 22, 24 which are connected to and extend away from the frontal impact center panel to establish fluid communication with the inflator 12.

In FIG. 2, there is illustrated a potentially preferred seaming arrangement for use in establishing the connective relationship between the frontal impact center panel 20 and the body panel sections 22, 24. As illustrated, the body panel sections 22, 24 are connected to one another by means of a substantially straight body seam 26. While only one such body seam 26 is illustrated in FIG. 2 it is to be understood that in the preferred embodiment an identical seam is likewise disposed along the length of the body panel sections 22, 24 on the opposite side of the restraint cushion 10. In the illustrated and potentially preferred embodiment as shown in FIG. 2, the frontal impact panel 20 is preferably joined to the non-seamed edges of the body panel sections 22, 24 by means of a series of substantially straight face seams 27 as shown. Once the seaming operations are completed, the inflatable restraint cushion 10 is preferably turned inside out so as to place the seams on the interior thereof during an inflation event. Moreover, while the assembly configuration as shown in FIG. 2 has a relatively straight line box-like configuration, once the cushion 10 is turned inside out and inflated, the profile tends to assume the generally desirable rounded profile as illustrated in FIG. 1.

It will be understood that reference herein to seams or seaming operations include not only traditional sewn seams but also by way of example only and not limitation, interwoven seams, adhesive seams, melt bonded seams, ultrasonic seams, and other suitable attachment methods as may be known to those of skill in the art. Thus, while traditional sewn seams may be preferred, the invention is in no way limited thereto.

In FIGS. 3A–3C there is illustrated a first potentially preferred configuration for the body panel sections 22, 24 and the frontal impact center panel or section 20 of the inflatable restraint cushion 10 according to the present invention. As illustrated, each of the body panel sections 22, 24 is generally of a diamond shape including a substantially straight upper boundary edge 28, 30 bounded by a first terminal end "A" and a second terminal end "B". Each of the body panel sections 22, 24 also preferably includes a first substantially straight lateral boundary edge 34, 38 and a second substantially straight lateral boundary edge 36, 40. Each of the body panel sections 22, 24 also preferably includes a first substantially straight intermediate boundary edge 42, 44 extending between the first terminal end of the upper boundary edge 28, 30 and the first lateral boundary edge 34, 38 as shown. A second substantially straight intermediate boundary edge 46, 48 preferably connects the second terminal end of the upper boundary edge 28, 30 of each body panel section to the second lateral boundary edge 36, 40 thereof.

As illustrated in FIG. 3C the frontal impact center panel 20 is preferably of a rectilinear geometry including four substantially straight boundary edges 52, 54, 56, and 58 as shown. The impact center panel 20 is preferably of a square or rectangular geometry having substantially right angles between intersecting boundary edges. It is contemplated that a non-square elongate geometry having a length dimension which is substantially greater than the width dimension may be utilized. In such a geometry the length dimension would preferably be at least ten percent greater that the width dimension, would more preferably be at least 20 percent greater than the width dimension, and would most preferably be at least 30 percent greater than the width dimension, although it is to be understood that such length dimension may be substantially greater than these identifiable minimums and may, in fact be many times the width dimension if a substantial area is to be covered.

The materials of construction from which the frontal impact center panel 20 and each body panel section 22, 24 are formed, may be either similar or dissimilar from one another. Each of these panels may be formed from a number of materials including by way of example only and not limitation woven fabrics, knitted fabrics, non-woven fabrics, films and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In instances where the cushion is to be formed by sewing together precut panel sections 20, 22, 24 from a base material and a woven fabric is utilized for a frontal impact center panel 20 such panel is preferably cut from the fabric such that its boundary edges are disposed substantially parallel to the warp and fill directions. Likewise, in instances where woven fabric is utilized to form the body panel sections 22, 24 such panels are preferably cut such that the upper boundary edges 28, 30 run substantially parallel to either the warp or the fill directions.

In application, woven fabrics formed from synthetic yarns having linear densities of about 40 denier to about 1200 denier are believed to be useful in the formation of the cushion 10 according to the present invention. Fabrics formed from yarns having linear densities of about 315 denier to about 840 denier are believed to be particularly useful, and fabrics formed from yarns having linear densities in the range of about 400 denier to about 650 denier are believed to be most useful.

While each of the panels 20, 22, 24 may be formed of the same material, the panels may also be formed from differing materials and or constructions. By way of example only and not limitation, one or both of the body panel sections 22, 24 may be formed from an uncoated relatively high permeability fabric having an air permeability of about 5 CFM per square foot or higher while the center panel 20 is formed from a coated or uncoated fabric having an air permeability of about 3 CFM per square foot or less when measured at a differential pressure of 0.5 inches of water across the fabric. Fabrics having permeabilities of about 1–3 CFM per square foot may be desirable in either the body panels or center panel section. Fabrics having permeabilities below 2 CFM and preferably below 1 CFM in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred.

In the event that a coating is utilized on one or more material panels, neoprene, silicone, urethanes, or polyamides may be preferred. Coatings such as disperse polyamides having dry add on weights of about 0.6 ounces per square yard or less and more preferably about 0.4 ounces per square yard or less and most preferably about 0.3 ounces per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art.

While the restraint cushion 10 according to the present invention has been illustrated and is described herein in terms of the principal panel sections 20, 22, 24, it is to be understood that such cushion 10 may also include additional components such as shape defining tethers, gas vents, mouth reinforcements, and the like as may be known to those in the skill of the art.

The assembly and construction of the cushion 10 according to the present invention is best understood through reference to FIG. 2 and FIGS. 3A–3C. In the preferred practice of the present invention, substantially straight body seams 26 are applied along corresponding lateral boundary edges 34, 38 and 36, 40. The frontal impact center panel 20 is seamed along two opposing boundary edges 52, 54 to the substantially straight upper boundary edges 28, 30 of the body panel sections 22, 24. The intermediate boundary edges 42, 44, 46, 48 are seamed along the remaining boundary edges 56, 58 of the center panel 20 so as to form an enclosed structure.

In the illustrated and potentially preferred embodiment, the total perimeter length of the center panel 20 is substantially equal to the combined lengths of the upper boundary edges 28, 30 and intermediate boundary edges 42, 44, 46, 48 of the body panel sections. The use of such corresponding length segments permits complete closure using substantially straight seams without the occurrence of substantial puckering which may result from excess material. In the most preferred embodiment, the upper and lower boundary edges 52, 54 of the center panel will be of substantially equal length to the upper boundary edges 28, 30 of the body panel sections while the first substantially straight intermediate boundary edges 42, 44 of the body panel sections have a combined length which is substantially equal to the length of the first lateral boundary edge 56 of the center panel with the combined lengths of the second substantially straight intermediate boundary edges 46, 48 of the body panel sections being substantially equivalent to the length of the second center panel lateral boundary edge 58.

As will be appreciated, the preferred geometry permits formation of an enclosed cushion by means of a series of flat, straight seaming operations to form the body seams 26 and face seams 27 as illustrated in FIG. 2. Such flat, straight seaming operations greatly enhance the efficiency of the manufacturing process. In addition, in the event that a woven fabric is chosen as the material of construction, each of the face seams 27 will fall along the primary yarn directions in the center panel 20 thereby lending added stability to the frontal impact area of the cushion.

In FIGS. 4A–4C there is illustrated a frontal impact center panel or section 120 and corresponding body panel sections 122, 124 for use in formation of a cushion which has a deep arcuate expanded profile such as may be desirable for surrounding a dash panel in a top mount configuration. That is, where the cushion is deployed from the top of the dash panel rather than from a position directly opposing the occupant. As will be appreciated, the construction and assembly of the restraint cushion incorporating the panel sections as illustrated in FIGS. 4A–4C is substantially identical to the description provided above in relation to FIGS. 3A–3C. However, as illustrated the mouth-forming opening is arranged so as to accommodate an inflator in a top mount configuration. Panel sections 120, 122, and 124 have boundary edges 152, 154, 156, 158; 128, 134, 136, 142, 146; and, 130, 138, 140, 144, 148, respectively.

In FIGS. 5A–5C there is illustrated a frontal impact center panel or section 220 and corresponding body panel sections 222, 224 useful in applications requiring a cushion having an elongated profile. By way of example and not limitation, such application may include full frontal impact protection or side impact protection for an occupant's head and torso. As illustrated, in this embodiment the body panel sections 222, 224 are characterized by upper boundary edges 228, 230 of substantial length and a center panel 220 has corresponding substantial length dimensions along its upper and lower boundary edges 252, 254. As will be noted, this length dimension is more than two times the width as measured along the lateral boundary edges 256, 258. Once again, the construction is substantially similar to that described in relation to the prior configurations such that corresponding first lateral boundary edges 234, 238 are joined together; corresponding second lateral boundary edges 236, 240 are joined together upper and lower center panel boundary edges 252, 254 are joined to the upper boundary edges 228, 230 of the body panel sections; first intermediate boundary edges 242, 244 of the body panel sections are joined along a first lateral boundary edge 256 of the center panel and intermediate boundary edges 246, 248 of the body panel sections are joined along the remaining lateral boundary edge 258 of the center panel 220.

As will be appreciated, the resultant elongated cushion structure may be divided into individual lobes or chambers through the application of inflation limiting seams or tethers. As will be appreciated the incorporation of such lobes may be desirable to protect different sections of the body which behave in differing manners during an impact event. By way of example only and not limitation, an upper lobe may be used to protect the head and torso while a lower lobe may be used to protect the knee. One potentially preferred seaming configuration to develop such lobes is disclosed in my pending application Ser. No. 08/969,823 the contents of which are incorporated herein by reference.

In FIGS. 6A–6D there is illustrated yet another embodiment of the present invention which includes a rectilinear center panel or section 320 and two body panel sections 322, 324. As illustrated, the body panel sections of this embodiment are characterized by a relatively long, substantially straight upper boundary edge 328, 330 and intermediate boundary edges 342, 344, 346, 348 which are disposed at substantially right angles to such upper boundary edges. Panel section 320 has boundary edges 352, 354, 356, and 358.

The cushion assembly of this embodiment differs slightly from that of previous embodiments in that the body panel sections 322, 324 are seamed together along the corresponding lateral boundary edges 334, 338 and 336, 340 as well as along corresponding intermediate boundary edges 342, 344 and 346, 348 in order to enclose the cushion structure 310. The upper boundary edges 328, 330 of the body panel sections are wrapped around and seamed to the perimeter of the center panel 320. Accordingly, the upper boundary edge 328 of the first body panel section 322 is of a length sufficient to span the upper boundary edge 352 of the center panel as well as one half of each lateral edge thereof. In like fashion, the upper boundary edge 330 of the second body panel section is of sufficient length to wrap around the remaining perimeter of the center panel 320.

The introduction of a seam along the intermediate boundary edges of both body panels has been found to have the effect of forcing a portion of the body of the airbag to remain substantially at the face of the structure during a collision event as illustrated in FIG. 6D by the laterally disposed triangular segments 360, 362 which are substantially bisected by the seam lines 364, 366 formed along the intermediate boundary edges.

While the prior discussion has largely emphasized the formation of cushions according to the present invention by cutting the individual fabric panels 20, 22, 24 from sheets of the desired material and thereafter seaming those blanks together in the manner described, the present invention also contemplates so called "on-loom" cushion formation. Such formation preferably involves the use of a jacquard or dobby loom as are well known to those of skill in the art. As will be appreciated, these looms permit the formation and attachment of multiple layers of fabric in a single operation. In addition, these machines can be programmed to adjust the weave density or cover factor of different sections of the fabric. Hence it is contemplated that the cushion according to the present invention may be either partially or completely formed on such weaving machines thereby substantially reducing or eliminating subsequent sewing operations.

As will be in each of the illustrated and patentability preferred embodiments, a mouth to remain in the region below the terminus of the lateral boundary edges. As is well known, such mouth openings are mated to the inflator 12 either with or without an additional reinforcement layer.

In additional to the symmetrical straight-line double peaked mouth forming openings illustrated in FIGS. 3A–B, 5A–B and 6A–B and the arcuate top mount mouth opening illustrated in FIG. 4B, it is contemplated that multiple different mouth configurations may be applied to the present invention. By way of example only, and not limitation in FIG. 7A there is illustrated a body panel section 422 similar to previously described body panel sections 22, 24 but having a nonsymmetrical double peaked mouth configuration including a first peak 462, and a second peak 464. As will be understood, in the event that body panel sections which have such configuration are utilized, the inflator 12 is housed between such peaks either with or without additional mouth reinforcements.

Another potentially preferred mouth configuration is illustrated in FIG. 7B wherein there is illustrated a body panel section 522 similar to body panel sections 22, 24 but including a mouth-forming configuration of two angled tab portions 566, 568 on each panel section. These tab portions may be disposed around the inflator which is housed in the depression formed therebetween following cushion formation as described above.

In FIG. 7C there is illustrated yet another mouth forming configuration wherein each body panel section 622 terminates at its lower portion with a box tab 672 as shown. As will be understood, such box tabs may be used to surround the inflator in a simple and efficient manner.

In FIG. 8, there is illustrated a potentially preferred seaming arrangement for use in establishing the connective relationship between the frontal impact center panel 20 and the body panel sections 22, 24. Each of the sections 22, 24, is made up of panels or pieces 22A, 22B, 24A, 24B. As illustrated, the body panel sections 22, 24 are connected to one another by means of substantially straight body seams 26. Body panels 22A, 22B, and 24A, 24B are joined to one another by substantially straight body panel seams 25. While only one such body seam 26 and body panel seam 25 are illustrated in FIG. 8, it is to be understood that in the preferred embodiment identical seams are likewise disposed along the length of the body panel sections 22, 24 and body panels 22B, 24B on the opposite side of the restraint cushion 10. In the illustrated and potentially preferred embodiment as shown in FIG. 8, the frontal impact panel 20 is preferably joined to the non-seamed edges of the body panel sections 22, 24 by means of a series of substantially straight face seams 27 as shown. Once the seaming operations are completed, the inflatable restraint cushion 10 is preferably turned inside out so as to place the seams on the interior thereof during an inflation event. Moreover, while the assembly configuration as shown in FIG. 8 has a relatively straight line box-like configuration, once the cushion 10 is turned inside out and inflated, the profile tends to assume the generally desirable rounded profile as illustrated in FIG. 1.

Although each of the body panel sections 22, 24 are shown as being comprised of two panels or pieces 22A, 22B and 24A, 24B, respectively, it is contemplated that each section may be made up of one or more pieces. It is preferred that the pieces be joined by straight seams.

In FIGS. 9A–9C there is illustrated a first potentially preferred configuration for the body panel sections 22, 24 (panels or pieces 22A, 22B, 24A, 24B) and the frontal impact center panel or section 20 of the inflatable restraint cushion 10 according to the present invention. As illustrated, each of the body panel sections 22, 24 is generally of a diamond shape including a substantially straight upper boundary edge 28, 30 bounded by a first terminal end "A" and a second terminal end "B". Each of the body panel sections 22, 24 also preferably includes a first substantially straight lateral boundary edge 34, 38 and a second substantially straight lateral boundary edge 36, 40. Each of the body panel sections 22, 24 also preferably includes a first substantially straight intermediate boundary edge 42, 44 extending between the first terminal end of the upper boundary edge 28, 30 and the first lateral boundary edge 34, 38 as shown. A second substantially straight intermediate boundary edge 46, 48 preferably connects the second terminal end of the upper boundary edge 28, 30 of each body panel section to the second lateral boundary edge 36, 40 thereof.

As illustrated in FIG. 9C the frontal impact center panel 20 is preferably of a rectilinear geometry including four substantially straight boundary edges 52, 54, 56, 58 as shown. The impact center panel 20 is preferably of a square or rectangular geometry having substantially right angles between intersecting boundary edges. It is contemplated that a non-square elongate geometry having a length dimension which is substantially greater than the width dimension may be utilized. In such a geometry the length dimension would preferably be at least ten percent greater that the width dimension, would more preferably be at least 20 percent greater than the width dimension, and would most preferably be at least 30 percent greater than the width dimension, although it is to be understood that such length dimension may be substantially greater than these identifiable minimums and may, in fact be many times the width dimension if a substantial area is to be covered.

The materials of construction from which the frontal impact center panel 20 and each body panel section 22, 24 of FIGS. 9A–9C are formed, may be either similar or dissimilar from one another. Each of these panels may be formed from a number of materials including by way of example only and not limitation woven fabrics, knitted fabrics, non-woven fabrics, films and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In instances where the cushion is to be formed by sewing together precut panel sections 20, 22, 24 from a base material and a woven fabric is utilized for a frontal impact center panel 20 such panel is preferably cut from the fabric such that its boundary edges are disposed substantially parallel to the warp and fill directions. Likewise, in instances where woven fabric is utilized to form the body panel sections 22, 24 such panels are preferably cut such that the upper boundary edges 28, 30 run substantially parallel to either the warp or the fill directions.

In application, woven fabrics formed from synthetic yarns having linear densities of about 40 denier to about 1200 denier are believed to be useful in the formation of the cushion 10 according to the present invention. Fabrics formed from yarns having linear densities of about 315 denier to about 840 denier are believed to be particularly useful, and fabrics formed from yarns having linear densities in the range of about 400 denier to about 650 denier are believed to be most useful.

While each of the panels 20, 22, 24 may be formed of the same material, the panels may also be formed from differing materials and or constructions. By way of example only and not limitation, one or both of the body panel sections 22, 24 may be formed from an uncoated relatively high permeability fabric having an air permeability of about 5 CFM per square foot or higher while the center panel 20 is formed from a coated or uncoated fabric having an air permeability of about 3 CFM per square foot or less when measured at a differential pressure of 0.5 inches of water across the fabric. Fabrics having permeabilities of about 1–3 CFM per square foot may be desirable in either the body panels or center panel section. Fabrics having permeabilities below 2 CFM and preferably below 1 CFM in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred.

In the event that a coating is utilized on one or more material panels, neoprene, silicone, urethanes, or disperse polymers such as polyamides may be preferred. Coatings such as disperse polyamides having dry add on weights of about 0.6 ounces per square yard or less and more preferably about 0.4 ounces per square yard or less and most preferably about 0.3 ounces per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art.

While the restraint cushion 10 according to the present invention has been illustrated and is described herein in terms of the principal panel sections 20, 22, 24, it is to be understood that such cushion 10 may also include additional components such as shape defining tethers, gas vents, mouth reinforcements, and the like as may be known to those in the skill of the art.

The assembly and construction of the cushion 10 according to the present invention is best understood through reference to FIG. 8 and FIGS. 9A–9C. In the preferred practice of the present invention, substantially straight body panel seams 25 are applied along the abutting edges of panels 22A, 22B, and then 24A, 24B. Body seams 26 are applied along corresponding lateral boundary edges 34, 38 and 36, 40. The frontal impact center panel 20 is seamed along two opposing boundary edges 52, 54 to the substantially straight upper boundary edges 28, 30 of the body panel sections 22, 24. The intermediate boundary edges 42, 44, 46, 48 are seamed along the remaining boundary edges 56, 58 of the center panel 20 so as to form an enclosed structure. In the illustrated and potentially preferred embodiment, the total perimeter length of the center panel 20 is substantially equal to the combined lengths of the upper boundary edges 28, 30 and intermediate boundary edges 42, 44, 46, 48 of the body panel sections. The use of such corresponding length segments permits complete closure using substantially straight seams without the occurrence of substantial puckering which may result from excess material. In the most preferred embodiment, the upper and lower boundary edges 52, 54 of the center panel will be of substantially equal length to the upper boundary edges 28, 30 of the body panel sections while the first substantially straight intermediate boundary edges 42, 44 of the body panel sections have a combined length which is substantially equal to the length of the first lateral boundary edge 56 of the center panel with the combined lengths of the second substantially straight intermediate boundary edges 46, 48 of the body panel sections being substantially equivalent to the length of the second center panel lateral boundary edge 58.

As will be appreciated, the preferred geometry permits formation of an enclosed cushion by means of a series of flat, straight seaming operations to form the body panel seams 25, body seams 26 and face seams 27 as illustrated in FIG. 8. Such flat, straight seaming operations greatly enhance the efficiency of the manufacturing process. In addition, in the event that a woven fabric is chosen as the material of construction, each of the face seams 27 will fall along the primary yarn directions in the center panel 20 thereby lending added stability to the frontal impact area of the cushion.

In FIGS. 10A–10C there is illustrated a frontal impact center panel or section 120 and corresponding body panel sections 122, 124, made up of panels or pieces 122A, 122B, 124A, 124B, for use in formation of a cushion which has a deep arcuate expanded profile such as may be desirable for surrounding a dash panel in a top mount configuration. That is, where the cushion is deployed from the top of the dash panel rather than from a position directly opposing the occupant. As will be appreciated, the construction and assembly of the restraint cushion incorporating the panel sections as illustrated in FIGS. 10A–C is substantially identical to the description provided above in relation to FIGS. 9A–C. However, as illustrated the mouth-forming opening is arranged so as to accommodate an inflator in a top mount configuration. Panel sections 120, 122, and 124 have boundary edges 152, 154, 156, 158; 128, 134, 136, 142, 146; and, 130, 138, 140, 144, 148, respectively.

In FIGS. 11A–11C there is illustrated a frontal impact center panel or section 220 and corresponding body panel sections 222, 224, made up of panels or pieces 222A, 222B, 224A, 224B, useful in applications requiring a cushion having an elongated profile. By way of example and not limitation, such application may include full frontal impact protection or side impact protection for an occupant's head and torso. As illustrated, in this embodiment the body panel sections 222, 224 are characterized by upper boundary edges 228, 230 of substantial length and a center panel 220 has corresponding substantial length dimension along its upper and lower boundary edges 252, 254. As will be noted, this length dimension is more than two times the width as measured along the lateral boundary edges 256, 258. Once again, the construction is substantially similar to that described in relation to the prior configurations such that the panels 222A, 222B, and 224A, 224B are joined together, then corresponding first lateral boundary edges 234, 238 are joined together; corresponding second lateral boundary edges 236, 240 are joined together; upper and lower center panel boundary edges 252, 254 are joined to the upper boundary edges 228, 230 of the body panel sections; first intermediate boundary edges 242, 244 of the body panel sections are joined along a first lateral boundary edge 256 of the center panel and second intermediate boundary edges 246, 248 of the body panel sections are joined along the remaining lateral boundary edge 258 of the center panel 220.

As will be appreciated, the resultant elongated cushion structure may be divided into individual lobes or chambers through the application of inflation limiting seams or tethers. As will be appreciated the incorporation of such lobes may be desirable to protect different sections of the body which behave in differing manners during an impact event. By way of example only and not limitation, an upper lobe may be used to protect the head and torso while a lower lobe may be used to protect the knee. One potentially preferred seaming configuration to develop such lobes is disclosed in my pending application Ser. No. 08/969,823 the contents of which are incorporated herein by reference.

In FIGS. 12A–12D there is illustrated yet another embodiment of the present invention which includes a rectilinear center panel or section 320 and two body panel sections 322, 324, made up of panels or pieces 322A, 322B, 324A, 324B. As illustrated, the body panel sections of this embodiment are characterized by a relatively long, substantially straight upper boundary edge 328, 330 and intermediate boundary edges 342, 344, 346, 348 which are disposed at substantially right angles to such upper boundary edges.

The cushion assembly of this embodiment differs slightly from that of previous embodiments in that the panels 322A, 322B and 324A, 324B are seamed together along their abutting edges, then the body panel sections 322, 324 are seamed together along the corresponding lateral boundary edges 334, 338 and 336, 340 as well as along corresponding intermediate boundary edges 342, 344 and 346, 348 in order to enclose the cushion structure 310. The upper boundary edges 328, 330 of the body panel sections are wrapped around and seamed to the perimeter of the center panel 320. Accordingly, the upper boundary edge 328 of the first body panel section 322 is of a length sufficient to span the upper boundary edge 352 of the center panel as well as one half of each lateral edge thereof. In like fashion, the upper boundary edge 330 of the second body panel section is of sufficient length to wrap around the remaining perimeter of the center panel 320.

The introduction of a seam along the intermediate boundary edges of both body panels has been found to have the effect of forcing a portion of the body of the airbag to remain substantially at the face of the structure during a collision event as illustrated in FIG. 12D by the laterally disposed triangular segments 360, 362 which are substantially bisected by the seam lines 364, 366 formed along the intermediate boundary edges.

As will be understood, in each of the illustrated and patentability preferred embodiments, a mouth opening is permitted to remain in the region below the terminus of the lateral boundary edges. As is well known, such mouth openings are mated to the inflator 12 either with or without additional reinforcement layers.

In addition to the symmetrical straight-line double peaked mouth forming openings illustrated in FIGS 9A–9B, 11A–11B and 12A–12B and the arcuate top mount mouth opening illustrated in FIG. 10B, it is contemplated that multiple different mouth configurations may be applied to the present invention. By way of example only, and not limitation in FIG. 13A there is illustrated a body panel section 422 (made up of panels or pieces 422A, 422B) similar to previously described body panel sections 22, 24 but having a nonsymmetrical double peaked mouth configuration including a first peak 462, and a second peak 464. As will be understood, in the event that body panel sections which have such configuration are utilized, the inflator 12 is housed between such peaks either with or without additional mouth reinforcements.

Another potentially preferred mouth configuration is illustrated in FIG. 13B wherein there is illustrated a body panel section 522 (made up of panels or pieces 522A, 522B) similar to body panel sections 22, 24 but including a mouth-forming configuration of two angled tab portions 566, 568 on each panel section. These tab portions may be disposed around the inflator which is housed in the depression formed therebetween following cushion formation as described above.

In FIG. 13C there is illustrated yet another mouth forming configuration wherein each body panel section 622 (made up of panels or pieces 622A, 622B) terminates at its lower portion with a box tab 672 as shown. As will be understood, such box tabs may be used to surround the inflator in a simple and efficient manner.

Although each of the body panel sections are shown as being comprised of one or two panels or pieces, it is contemplated that each section may be made up of one or more pieces. It is preferred that the pieces be joined by straight seams.

In FIGS. 14A–14C there is illustrated another configuration with top, center (body), and bottom panel sections 702, 704, 706 and the top panel section serves as the frontal impact panel or section of the inflatable restraint cushion according to the present invention.

The airbag of the embodiment shown in FIGS. 14A–14C of the drawings is manufactured by attaching the panel sections 702, 704, and 706 to one another by the following steps:

1. Align any reinforcement patches around the mouth and vents using, for example, pre-cut alignment holes and sew the seams to secure the reinforcements.
2. Connect (3, 5) to (3', 5').
3. Connect (4, 6) to (4', 6').
4. Connect (5, 7, 8, 6) to (5", 7", 8", and 6").

In FIGS. 15A–15C there is illustrated still another configuration with top, center (body), and bottom panel sections 802, 804, and 806 with the top panel section serving as the frontal impact panel of the inflatable restrain cushion according to the present invention.

The panel sections shown in FIGS. 15A–15C of the drawings are manufactured or attached to one another to form an airbag cushion by the following steps:

1. Align any reinforcement patches around the mouth and vents using, for example, pre-cut alignment holes and sew the seams to secure the reinforcements.
2. Connect (3, 5) to (3', 5').
3. Connect (4, 6) to (4', 6').
4. Connect (5, 7, 8, 6) to (5", 7", 8", and 6").

With reference to FIGS. 16A–16C of the drawings, each of the panel sections 702, 704, and 706 is formed of a plurality of section panels, respectively, 702A, 702B, 704A, 704B, and 706A, 706B. Although each of the panel sections is shown to be formed of two panels or pieces, it is to be understood that they may be formed of two or more panels.

In the manufacture of an airbag from the section panels shown in FIGS. 16A–16C, it is preferred to join the section panels prior to joining the panel sections. The section panels are joined by seams along the adjacent or abutting edges of the section panels.

With reference to FIGS. 17A–17C of the drawings, each of the top, center, and bottom panel sections 802, 804, and 806 is shown to be formed from a plurality of section panels, respectively, 802A, 802B, 804A–804F, and 806A, 806B. Like the panels shown in FIGS. 16A–16C, the panels shown in FIGS. 17A–17C are preferably joined to one another prior to the joining, connection or attachment of the panel sections.

In FIGS. 18A–18D of the drawings, there is illustrated still another configuration with a top panel section 902, a center or body panel section 904, and loop pocket or inflator attachment panel sections 906 and 908. The panel sections 902, 904, 906, and 908 are attached to one another and an airbag is formed by the following steps;

1. Align any reinforcement patches and vents using, for example, pre-cut alignment holes and sewing the seams to secure the reinforcements.
2. Connect or attach (3, 5) to (3', 5').
3. Attach (1', 2') to (1", 2").
4. Attach (4) to (4") and (6) to (6") to complete the conical structure.
5. Attach the front panel by sewing (7,8) to (7''', 8''') and (4,6) to (4''', 6''').

With reference to FIGS. 19A–19D of the drawings, each of the panel sections 902, 904, 906, and 908 are shown to be formed of a plurality of section panels, respectively, 902A, 902B, 904A–904D, 906A, 906B, and 908A, 908B. In the manufacture of an airbag from these panels, it is preferred that the section panels be joined to one another along the abutting or adjacent edges prior to the joining, attachment, or connection of the panel sections.

With reference to FIGS. 20–25 of the drawings and in accordance with yet other embodiments of the present invention, preferably a unitary, elongated, notched body panel 1000 is adapted to be used with a substantially rectangular (or square) center or front panel. The body panel 1000 of FIG. 20 is a single body panel in place of separate body panel sections (top and bottom sections) as shown, for example, in FIGS. 3A, 3B, 5A, 5B, 6A, 6B, 7A, 7B, 7C, 9A, 9B, etc. If desired the body panel 1000 may be made in sections and connected together in any suitable fashion to form the body panel 1000.

The body panel 1000 includes equal sized right and left notches 1002, 1003, and an inflator opening 1004. The notches 1002, 1003, may be sized larger to provide more profile to the bag (FIG. 23) as shown by the dashed line notches 1006, 1007 in FIG. 20. Preferably the apex of the notches 1002 and 1003 are located on the centerline of the inflator opening 1004.

In FIGS. 21 and 22 there is illustrated a potentially preferred configuration for the body panel 1010 and the frontal impact center panel 1020 of an inflatable restraint cushion 1030 according to the present invention.

The assembly and construction of the cushion 1030 according to the present invention is best understood through reference to FIG. 23 and FIGS. 21 and 22. In the preferred practice of the present invention, the notches are sewn shut by connecting 5-6-5' and 7-8-7', each by a straight seam line, then the front panel 1020 is connected to the body panel 1010 by connecting (1, 2, 3, 4) to (1', 2', 3', 4'). The straight seams prevent the cushion 1030 from expanding uncontrolled to cause the front panel 1020 to impact the driver or occupant of the vehicle in which it is installed. The straight seams negate the use of a tether to control expansion of the cushion and reduces the elongation over the typical air bag by about 30%.

Body panel 1040 and front panel 1050 of FIGS. 24 and 25, respectively are like body panel 1000 of FIG. 20 or body panel 1010 of FIG. 21 and front panel 1020 of FIG. 22 and are joined to form an airbag in a similar fashion.

The body panels, front panels, and airbags of FIGS. 20–25 of the drawings are especially adapted to form passenger side airbags and can be formed, for example, to provide for top of 3/4 mount airbags.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention which in the true spirit and scope of the claims hereto.

What is claimed is:

1. An airbag cushion for use in a vehicle restraint system, the cushion comprising:
    a notched body panel having notches in boundary edges thereof; and
    a substantially rectangular frontal center panel;
    said notches of said body panel being seamed together along abutting edges thereof to fold said body panel and form a profile,
    said body panel and said center panel being seamed together along corresponding boundary edges of said body panel and around the entire perimeter of said center panel by a series of substantially straight seams thereby forming an inflatable structure.

2. The cushion as recited in claim 1, wherein said rectangular center panel is substantially square.

3. The cushion as in claim 1, wherein said rectangular center panel is of an elongated rectangular geometry wherein said geometry has a length dimension greater than its width dimension.

4. The cushion as recited in claim 3, wherein said length dimension is at least 30 percent greater than said width dimension.

5. The cushion as recited in claim 4, wherein said length dimension is at least twice as great as said width dimension.

6. The cushion as recited in claim 1, wherein said body panel and said center panel each comprise a woven fabric.

7. The cushion as recited in claim 6, wherein the woven fabric which comprises said body panel exhibits permeability characteristics which differ from the fabric which comprises said center panel.

8. The cushion as recited in claim 6, wherein the woven fabric which comprises said body panel is an uncoated fabric and the woven fabric which comprises said center panel is a coated fabric.

9. The cushion as recited in claim 8, wherein said coated fabric is coated with a disperse polymer having a dry add on weight of not greater than about 0.4 ounces per square yard.

10. The cushion as recited in claim 6, wherein the fabric which comprises at least one of said body panel and said center panel is woven from a plurality of multifilament synthetic yarns wherein the filaments forming said synthetic yarns are characterized by a linear density of about 4 denier per filament or less.

11. The cushion as recited in claim 10, wherein said multifilament synthetic yarns are characterized by a yarn linear density of about 840 denier or less.

12. The cushion as recited in claim 6, wherein the woven fabric which comprises said body panel is uncoated, and the woven fabric which comprises said center panel is uncoated.

13. The cushion as recited in claim 6, wherein the woven fabric which comprises said center panel is characterized by an air permeability of about 1–3 cubic feet per minute per square foot of fabric at a differential pressure of 0.5 inches of water.

14. The cushion as recited in claim 1, wherein said notched body panel includes first and second notches that are V-shaped.

15. The cushion as recited in claim 14, wherein each of said first and second notches have an apex angle of not greater than about 90 degrees.

16. The cushion as recited in claim 1, wherein said body panel is made up of a plurality of panel sections.

17. In a vehicle restraint system, the improvement comprising the cushion of claim 1.

18. In an airbag module, the improvement comprising the cushion of claim 1.

19. The cushion of claim 1 in which the body panel is longer than it is wide and the notches are in the sides of said body panel.

20. The cushion of claim 1 wherein an inflator opening is located in said body panel between said notches.

21. The cushion of claim 20 wherein said notches are of substantially equal size.

22. The cushion of claim 21 wherein the apex of each notch is located substantially along a center line of said inflator opening.

23. An airbag cushion for use in a vehicle restraint system, the cushion comprising:
    a notched body panel having notches in boundary edges thereof; and
    a rectangular frontal center panel;
    said notches of said body panel being seamed together along abutting edges thereof to fold said body panel and form a profile, and
    said body panel and said center panel being seamed together along corresponding boundary edges of said body panel and around the entire perimeter of said center panel by a series of substantially straight seams thereby forming an inflatable structure whereby said seamed notches prevent said body panel from uncontrollable expanse.

24. The cushion as recited in claim 23, wherein said rectangular center panel is substantially square.

25. The cushion as in claim 23, wherein said rectangular center panel is of an elongated rectangular geometry wherein said geometry has a length dimension greater than its width dimension.

26. The cushion as recited in claim 25, wherein said length dimension is at least 30 percent greater than said width dimension.

27. The cushion as recited in claim 26, wherein said length dimension is at least twice as great as said width dimension.

28. An airbag cushion for use in a vehicle restraint system for protecting an occupant of a vehicle, the cushion comprising:
    a notched body panel having notches in the sides thereof and an inflator opening;

a rectangular frontal center panel;

said notches of said body panel being seamed together along abutting edges thereof to fold said body panel and form a profile, and said body panel and said cener panel being seamed together along corresponding boundary edges of said body panel and around the entire perimeter of said center panel by a series of substantially straight seams thereby forming an inflatable structure wherein said seamed notches prevent the body panel from excessive expansion to prevent said center panel from hitting an occupant of a vehicle with excessive force upon inflation of the airbag cushion.

29. The cushion as recited in claim 28, wherein said rectangular center panel is substantially square.

30. The cushion as in claim 28, wherein said rectangular center panel is of an elongated rectangular geometry wherein said geometry has a length dimension greater than its width dimension.

31. The cushion as recited in claim 30, wherein said length dimension is at least 30 percent greater than said width dimension.

32. The cushion as recited in claim 31, wherein said length dimension is at least twice as great as said width dimension.

* * * * *